(12) United States Patent
Noyes

(10) Patent No.: US 10,489,797 B2
(45) Date of Patent: Nov. 26, 2019

(54) METHODS AND SYSTEMS FOR A VIRTUAL MARKETPLACE OR EXCHANGE FOR DISTRIBUTED SIGNALS INCLUDING DATA CORRELATION ENGINES

(71) Applicant: Commerce Signals, Inc., Davidson, NC (US)

(72) Inventor: Thomas Noyes, Davidson, NC (US)

(73) Assignee: COMMERCE SIGNALS, INC., Davidson, NC (US)

( * ) Notice: Subject to any disclaimer, the term of this patent is extended or adjusted under 35 U.S.C. 154(b) by 556 days.

(21) Appl. No.: 14/214,743

(22) Filed: Mar. 15, 2014

(65) Prior Publication Data
US 2014/0278764 A1 Sep. 18, 2014

Related U.S. Application Data

(60) Provisional application No. 61/791,297, filed on Mar. 15, 2013.

(51) Int. Cl.
*G06Q 30/06* (2012.01)
*G06Q 30/02* (2012.01)
(Continued)

(52) U.S. Cl.
CPC ..... *G06Q 30/0201* (2013.01); *G06Q 30/0202* (2013.01); *G06Q 30/0206* (2013.01);
(Continued)

(58) Field of Classification Search
None
See application file for complete search history.

(56) References Cited

U.S. PATENT DOCUMENTS 5,077,665 A * 12/1991 Silverman .............. G06Q 40/04
705/37
6,216,129 B1 4/2001 Eldering
(Continued)

FOREIGN PATENT DOCUMENTS

EP 2063387 A1 5/2009
EP 2076877 A1 7/2009

OTHER PUBLICATIONS

Real-Time Ad Targeting (Published online on Apr. 26, 2016 on https://www.quantcast.com/blog/real-time-ad-targeting-scalingquantcast-advertisng-to-100-million-machine-learning-predictions-per-second/).

Primary Examiner — Patricia H Munson
Assistant Examiner — Sarjit S Bains
(74) Attorney, Agent, or Firm — Neo IP

(57) ABSTRACT

Methods and systems for providing an automated virtualized signal marketplace or exchange for signals from distributed data sources that are controlled by a multiplicity of signal sellers or signal owners, including at least one data correlation engine that is operable for processing the signals to generate at least one correlation value relating to a specific objective for signal buyers corresponding to the behavior of the object and/or the activity and/or the event. Signals are indicators of data that are derived from data sources and abstracted to protect the underlying data. Each entity that sells data in the virtual marketplace first converts data into a "signal" or indicator that represents the data without disclosing it or providing it. Signal sellers determine if they wants share signals based upon buyer, price, and other rules, including limitations on signal use. Signal buyers determine signal value based upon their objectives.

22 Claims, 7 Drawing Sheets

(51) Int. Cl.
*G06Q 30/08* (2012.01)
*G06Q 40/04* (2012.01)

(52) U.S. Cl.
CPC ......... *G06Q 30/0244* (2013.01); *G06Q 30/06* (2013.01); *G06Q 30/08* (2013.01); *G06Q 40/04* (2013.01)

(56) References Cited

U.S. PATENT DOCUMENTS

| | | |
|---|---|---|
| 6,275,824 B1 | 8/2001 | O'Flaherty et al. |
| 6,324,519 B1 | 11/2001 | Eldering |
| 6,363,488 B1 | 3/2002 | Ginter et al. |
| 6,381,602 B1 | 4/2002 | Shoroff et al. |
| 6,850,900 B1 | 2/2005 | Hare et al. |
| 7,233,948 B1 * | 6/2007 | Shamoon ....... H04N 21/234318 |
| 7,630,986 B1 | 12/2009 | Herz et al. |
| 8,224,725 B2 | 7/2012 | Grim et al. |
| 8,229,902 B2 | 7/2012 | Vishniac et al. |
| 8,285,610 B2 | 10/2012 | Engle et al. |
| 8,380,738 B2 | 2/2013 | Tatemura et al. |
| 8,812,355 B2 | 8/2014 | Angell et al. |
| 8,914,903 B1 | 12/2014 | Lee et al. |
| 9,799,042 B2 | 10/2017 | Noyes |
| 2001/0004733 A1 | 6/2001 | Eldering |
| 2003/0144924 A1 | 7/2003 | McGee |
| 2004/0148290 A1 * | 7/2004 | Merenda ................... A01H 5/02 |
| 2004/0267630 A1 | 12/2004 | Au et al. |
| 2005/0004789 A1 | 1/2005 | Summers |
| 2005/0177742 A1 | 8/2005 | Benson et al. |
| 2006/0168059 A1 | 7/2006 | Chang et al. |
| 2006/0230053 A1 | 10/2006 | Eldering |
| 2007/0011050 A1 | 1/2007 | Klopf et al. |
| 2007/0067297 A1 | 3/2007 | Kublickis |
| 2007/0110240 A1 * | 5/2007 | Moskowitz ...... G11B 20/00086 380/252 |
| 2007/0130070 A1 | 6/2007 | Williams |
| 2007/0174119 A1 | 7/2007 | Ramsey et al. |
| 2007/0208630 A1 | 9/2007 | Chatter et al. |
| 2008/0059624 A1 * | 3/2008 | Groz ....................... G06Q 40/04 709/223 |
| 2008/0103795 A1 | 5/2008 | Jakubowski et al. |
| 2008/0103902 A1 | 5/2008 | Burdick et al. |
| 2009/0177591 A1 | 7/2009 | Thorpe et al. |
| 2009/0222329 A1 * | 9/2009 | Ramer ............. G06F 17/30749 705/14.52 |
| 2009/0228397 A1 | 9/2009 | Tawakol et al. |
| 2009/0234711 A1 | 9/2009 | Ramer et al. |
| 2009/0240568 A1 | 9/2009 | Ramer et al. |
| 2009/0240569 A1 | 9/2009 | Ramer et al. |
| 2009/0307085 A1 | 12/2009 | Lejano et al. |
| 2009/0327150 A1 * | 12/2009 | Flake ............... G06Q 10/0637 705/80 |
| 2010/0156933 A1 | 6/2010 | Jones et al. |
| 2010/0262497 A1 | 10/2010 | Karlsson |
| 2010/0317420 A1 * | 12/2010 | Hoffberg ........... G06Q 30/0207 463/1 |
| 2011/0137786 A1 * | 6/2011 | Lutnick .................. G06Q 40/04 705/37 |
| 2011/0178845 A1 | 7/2011 | Rane et al. |
| 2011/0225037 A1 | 9/2011 | Tunca et al. |
| 2011/0246309 A1 | 10/2011 | Shkedi |
| 2011/0264497 A1 | 10/2011 | Clyne |
| 2011/0264567 A1 | 10/2011 | Clyne |
| 2012/0054189 A1 | 3/2012 | Moonka et al. |
| 2012/0066062 A1 | 3/2012 | Yoder et al. |
| 2012/0066064 A1 | 3/2012 | Yoder et al. |
| 2012/0179543 A1 | 7/2012 | Luo et al. |
| 2012/0185349 A1 | 7/2012 | Soroca et al. |
| 2012/0232960 A1 | 9/2012 | Smith |
| 2012/0233206 A1 | 9/2012 | Peterson et al. |
| 2012/0239479 A1 * | 9/2012 | Amaro ................. G06Q 20/102 705/14.23 |
| 2012/0271748 A1 * | 10/2012 | DiSalvo ............... G06Q 40/04 705/37 |
| 2012/0284317 A1 | 11/2012 | Dalton |
| 2012/0323674 A1 * | 12/2012 | Simmons ............... G06Q 30/02 705/14.41 |
| 2012/0323954 A1 | 12/2012 | Bonalle et al. |
| 2013/0066771 A1 * | 3/2013 | Ciurea ............... G06Q 30/0201 705/39 |
| 2013/0073366 A1 | 3/2013 | Heath |
| 2013/0191213 A1 * | 7/2013 | Beck .................. G06Q 30/0267 705/14.53 |
| 2013/0212041 A1 * | 8/2013 | Feldman .............. G06Q 40/06 705/36 R |
| 2013/0275178 A1 * | 10/2013 | Flake .................... G06Q 30/08 705/7.29 |
| 2014/0101685 A1 | 4/2014 | Kitts et al. |
| 2014/0129499 A1 | 5/2014 | Hawkins |
| 2014/0149273 A1 * | 5/2014 | Angell .................. G06Q 40/04 705/37 |
| 2014/0229351 A1 * | 8/2014 | Lutnick ................ G06Q 40/04 705/37 |
| 2014/0278762 A1 | 9/2014 | Noyes |
| 2014/0278763 A1 | 9/2014 | Noyes |
| 2014/0278764 A1 | 9/2014 | Noyes |
| 2014/0278776 A1 | 9/2014 | Noyes et al. |
| 2015/0095145 A1 * | 4/2015 | Shulman ............ G06Q 30/0241 705/14.53 |
| 2015/0178744 A1 | 6/2015 | Noyes |
| 2015/0199699 A1 | 7/2015 | Milton et al. |
| 2015/0213465 A1 | 7/2015 | Noyes et al. |
| 2016/0055129 A1 | 2/2016 | Kan et al. |
| 2017/0148048 A1 | 5/2017 | Cook et al. |
| 2017/0207916 A1 | 7/2017 | Luce et al. |
| 2018/0040009 A1 | 2/2018 | Noyes |
| 2018/0096365 A1 | 4/2018 | Noyes et al. |
| 2018/0096417 A1 | 4/2018 | Cook et al. |

* cited by examiner

METHODS AND SYSTEMS FOR A VIRTUAL MARKETPLACE OR EXCHANGE FOR DISTRIBUTED SIGNALS INCLUDING DATA CORRELATION ENGINES

CROSS REFERENCE TO RELATED APPLICATIONS

This application claims the benefit of U.S. Provisional Application No. 61/791,297, filed Mar. 15, 2013, which is incorporated herein by reference in its entirety.

BACKGROUND OF THE INVENTION

1. Field of the Invention

The present invention relates to methods and systems for providing a virtual marketplace or exchange for distributed signals or indicators by signal sellers for distribution and sale to signal buyers, for use toward advertising or other objectives.

2. Description of the Prior Art

Generally, it is known in the prior art to provide market signals as information passed between participants in a market. Examples of relevant art documents include the following:

U.S. Patent Application Publication No. 2011/0178845 for "System and Method for Matching Merchants to a Population of Consumers" by inventors Rane, et al., filed Jan. 20, 2010, describes a process of data analysis for the purpose of improving targeted advertising and analytics of data, with the major focus on drawing useful inferences for various entities from aggregated data, wherein entities are not limited to businesses and may include government agencies (census, polling data, etc.).

U.S. Patent Application Publication No. 2012/0233206 for "Methods and Systems for Electronic Data Exchange Utilizing Centralized Management Technology" by inventors Peterson, et al., filed May 24, 2012, describes an exchange of data among business entities and the process of disclosing/receiving data and a central management system for companies engaged in strategic partnership or alliance, whereas Patent 1 deals with a market place dynamic rather than a data exchange within a locked-in partnership management.

U.S. Patent Application Publication No. 2012/0066062 for "Systems and Methods to Present Triggers for Real-Time Offers" by inventors Yoder, et al., filed Aug. 8, 2011, describes collecting consumer transaction data for the benefit of targeted advertisements and an auctioning process (auction engine) for providing data clusters to clients. For example, cardholders may register in a program to receive offers, such as promotions, discounts, sweepstakes, reward points, direct mail coupons, email coupons, etc. The cardholders may register with issuers, or with the portal of the transaction handler. Based on the transaction data or transaction records and/or the registration data, the profile generator is to identify the clusters of cardholders and the values representing the affinity of the cardholders to the clusters. Various entities may place bids according to the clusters and/or the values to gain access to the cardholders, such as the user. For example, an issuer may bid on access to offers; an acquirer and/or a merchant may bid on customer segments. An auction engine receives the bids and awards segments and offers based on the received bids. Thus, customers can get great deals; and merchants can get customer traffic and thus sales.

U.S. Patent Application Publication No. 2011/0246309 for "Method, stored program, and system for improving descriptive profiles" by inventor Shkedi, filed May 25, 2011, describes a process that enables entities to acquire databanks of user profiles that can add to existing knowledge of user profile data and the process is described as a transaction in that the entities disclose a set of profile information in exchange for additional, helpful data relevant to the disclosed data.

U.S. Patent Application Publication No. 2012/0323954 for "Systems and methods for cooperative data exchange" by inventors Bonalle, et al., filed Jun. 14, 2011, describes methods that enable business entities to gain greater, useful insights on their customers and build upon their relatively limited data via consumer data exchange, wherein upon sharing/merging/exchanging customer data, businesses can perform analysis to improve their business performance, and provides an example wherein original data may consist of a list of consumers, which can be enriched with the consumers' transaction history, search history, etc. via data exchange with other entities that own such information.

U.S. Patent Application Publication No. 2010/0262497 for "System and Methods for Controlling Bidding on Online Advertising Campaigns" by inventor Karlsson, filed Apr. 10, 2009, describes a system for managing bid prices of an online advertising campaign. The system includes a memory storing instructions for adjusting bid prices, and a campaign controller for generating a nominal bid price and a perturbation parameter, based on an ad request received from an advertiser. The system further includes an engine for generating a perturbed bid price based on the nominal bid price and the perturbation parameter, according to the instructions stored in the memory. The system further includes a serving unit for serving an ad impression based on the perturbed bid price. Also discloses that advertisers can bid on desired online ad delivery for their ad campaigns, describes management of the bidding process by managing and adjusting the bid price and describes systems and methods for a biddable multidimensional marketplace for advertising.

European Patent Application Publication No. 2063387 for "Systems and methods for a biddable multidimensional marketplace for advertising on a wireless communication device" by inventors Maggenti, et al., filed Mar. 31, 2008, describes providing targeted advertisements via mobile devices, and systems, methods and apparatus for a multidimensional bidding marketplace for providing advertising content to wireless devices. In particular, aspects allows advertising providers, to define and/or identify a one or more wireless device-based transient factors from a plurality of factors, which serve to define a targeted advertising audience and to bid on advertising based on the selected or identified transient factors.

European Patent Application No. 2076877 (also published as U.S. Patent Application Publication No. 2008/0103795) for "Lightweight and heavyweight interfaces to federated advertising marketplace" by inventors Biggs, et al., filed Oct. 18, 2007, describes a multi-party advertising exchange including advertising and publishing entities from different advertising networks, the invention provides architectures for an online advertising marketplace that range from lightweight to heavyweight implementations. A lightweight client side implementation of an interface includes centralized processing and storage of federated advertising marketplace data by centralized servers or services. A heavyweight client side implementation of an interface for advertising entities includes providing a peer instance of a federated advertising exchange application or set of processes is provided to each advertising entity as an interface for advertising entities where processing and storage are performed locally to each peer instance. Distributed advertising data can be replicated or synchronized with other peer instances.

U.S. Pat. No. 8,224,725 for "Escrowing digital property in a secure information vault" by inventors Grim, et al., filed Sep. 15, 2005, describes that data can be escrowed by receiving escrow parameters including a condition(s) for releasing the escrowed data, and an escrow recipient. An escrow contract is then created based upon the specified escrow parameters. The escrowing further includes storing the digital data in a secure information vault, and storing the escrow contract, along with a pointer to the stored data, in a database. When the condition has been satisfied, the data is released to the escrow recipient. The condition(s) for release can be a payment sum, a date, an indication from a depositor, a trustee or a vault administrator, and/or fulfillment of another escrow contract; also describes keeping data secure and releasing data to certain parties upon satisfaction of certain criteria.

U.S. Pat. No. 8,285,610 for "System and method of determining the quality of enhanced transaction data" by inventors Engle, et al., filed Mar. 26, 2009, describes "enhanced data", non-financial data beyond the primary transaction data and includes invoice level and line item details (for examples see background section) which is collected at the merchant and delivered to a financial service network.

U.S. Patent Application Publication No. 2011/0264497 for "Systems and Methods to Transfer Tax Credits" by inventor Clyne, filed Apr. 25, 2011, includes disclosure for a list of references describing acquiring consumer purchase data.

U.S. Patent Application Publication No. 2011/0264567 for "Systems and Methods to Provide Data Services" by inventor Clyne, filed Apr. 25, 2011, describes providing access to data of diverse sources in general, and more particularly, transaction data, such as records of payment made via credit cards, debit cards, prepaid cards, etc., and/or information based on or relevant to the transaction data; also describes that transaction data can be used for various purposes and that transaction data or information derived from transaction data may be provided to third parties.

U.S. Patent Application Publication No. 2012/0066064 for "Systems and Methods to Provide Real-Time Offers via a Cooperative Database" by inventors Yoder, et al., filed Sep. 2, 2011, describes a computing apparatus is configured to: store transaction data recording transactions processed by a transaction handler; organize third party data according to community, where the third party data includes first data received from a first plurality of entities of a first community and second data received from a second plurality of entities of a second community; and responsive to a request from a merchant in the second community, present an offer of the merchant in the second community to users identified via the transaction data and the first data received from the first plurality of entities of the first community. In one embodiment, the first data provides permission from the merchant in the first community to allow the merchant in the second community to use intelligence information of the first community to identify users for targeting offers from the merchant in the second community.

U.S. Patent Application Publication No. 2012/0054189 for "User List Identification" by inventors Moonka, et al., filed Aug. 30, 2011, describes systems, methods, computer program products are provided for presenting content. An example computer implemented method includes identifying, by a data exchange engine executing on one or more processors, one or more user lists based on owned or permissioned data, each user list including a unique identifier; associating metadata with each user list including data describing a category for the user list, population data describing statistical or inferred data concerning a list or members in a given user list and subscription data including data concerning use of a given user list; storing in a searchable database a user list identifier and the associated metadata; and publishing for potential subscribers a list of the user lists including providing an interface that includes for each user list the unique identifier and the associated metadata.

U.S. Pat. No. 6,850,900 for "Full service secure commercial electronic marketplace" by inventors Hare, et al. filed Jun. 19, 2000, describes an electronic marketplace, and in particular to a full service secure commercial electronic marketplace which generically organizes, stores, updates, and distributes product information from a plurality of suppliers to facilitate multiple levels of sourcing, including contract and off-contract purchasing between the suppliers and a plurality of buyers.

None of the prior art references discloses the systems and methods of the present invention for using signals for targeted advertising; or for providing a signals marketplace including at least one data correlation engine that is operable for processing the signals to generate at least one correlation value relating to a specific objective for signal buyers corresponding to the behavior of the object and/or the activity and/or the event; or for value-based exchange of distributed signals information between buyers and sellers, while ensuring protection of the underlying data represented by the signals; or pricing data signals based upon value derived from the use of data signals as observed from consumer behavior; or for constructing signals for controlled distribution and use by the signal owner and/or for generating signals from locally controlled and isolated sources for indexing, correlation, discovery and use in a federated model with a multiplicity of other signals and participants or for external objects, events, activities and behaviors to inform indexing and correlation of locally held data in a federated data model; or for external objects, events, activities and behaviors to inform indexing and correlation of locally held data in a federated data model. Thus, the creation of signals for a signals marketplace is important for providing secure, private and controlled release of information for value that is determined by a structured and rules-based distributed virtual marketplace for signals.

SUMMARY OF THE INVENTION

The present invention relates to methods and systems for providing a virtual marketplace or exchange for distributed signals or indicators by signal sellers for distribution and sale to signal buyers, including data correlation engines for processing the signals.

The present invention systems and methods provide for generating signals from locally controlled and isolated sources for indexing, correlation, discovery and use in a federated model with a multiplicity of other signals and participants or for external objects, events, activities and behaviors to inform indexing and correlation of locally held data in a federated data model, and/or for external objects, events, activities and behaviors to inform indexing and correlation of locally held data in a federated data model.

The distributed signals are constructed by signal sellers by transforming raw data into signals or indicators, which facilitate buying and selling distributed information through these signals or indicators without disclosing the underlying data. The signals are derived from data sources and abstracted to protect the underlying data. Signals are constructed in such a way that they protect the underlying data, but have consistency and relevance toward a given objective. The content of the seller's signal is based upon a current or historical interaction with one or more events, objects or activities that correspond to the behavior of an object. Signals are constructed around one or more reference point for the seller to create the signals payload. The signal structure provides for secure and reliable transportation and translation of the information payload contained within a signal. The signal construct defines the source, the destination, the delivery channel, the method for securing the data, the agreement under which the data is exchanged, a transaction identifier, a transaction time, information necessary to confirm receipt, template which describe the message type, and the payload of the message.

Each entity that sells data in the virtual marketplace first converts data into a "signal" or indicator, the construction of the signal is in the control of the data owner, different signal constructs will have relevance toward different objectives and signal buyers. The signal or indicator construct allows the signal seller to abstract the underlying data without being or disclosing the actual data itself, i.e., the signal functions like metadata. The economic value of the signal depends on the price each buyer is willing to pay, which depends on the value that the signal has toward a given objective. The virtual marketplace brings buyers and sellers of signals together and communicates the history of signal effectiveness for each objective. Sellers of signals define rules governing how to sell signals based upon virtual marketplace historical data, buyer, agreements, price, effectiveness, consumer permissions, competitive concerns and other rules. Buyers have the opportunity to bid for information within the rules of the marketplace and the rules of the seller. Signals (or indicators of data that do not disclose the data), and the associated virtual marketplace facilitate the discovery of signals for a use, pricing of signals for a defined use, the creation of agreements for use, the regulatory and consumer permission of use, the transmission and tracking during use, the value created after the use, and for the clearing and settlement based upon observations after the use and under the terms of the agreement.

It is an aspect of this invention to provide methods and systems for providing an automated virtualized signal marketplace or exchange for signals from distributed data sources that are controlled by a multiplicity of signal sellers or signal owners, the methods and systems including data correlation engines for processing the signals. Yet another aspect of the present invention is to provide systems including data correlation engines for automatically discovering and recommending which of the signals controlled by multiple entities may be most effective toward a given objective of the buyer(s). These and other aspects of the present invention will become apparent to those skilled in the art after a reading of the following description of the preferred embodiment when considered with the drawings, as they support the claimed invention.

DETAILED DESCRIPTION

Figure 1:
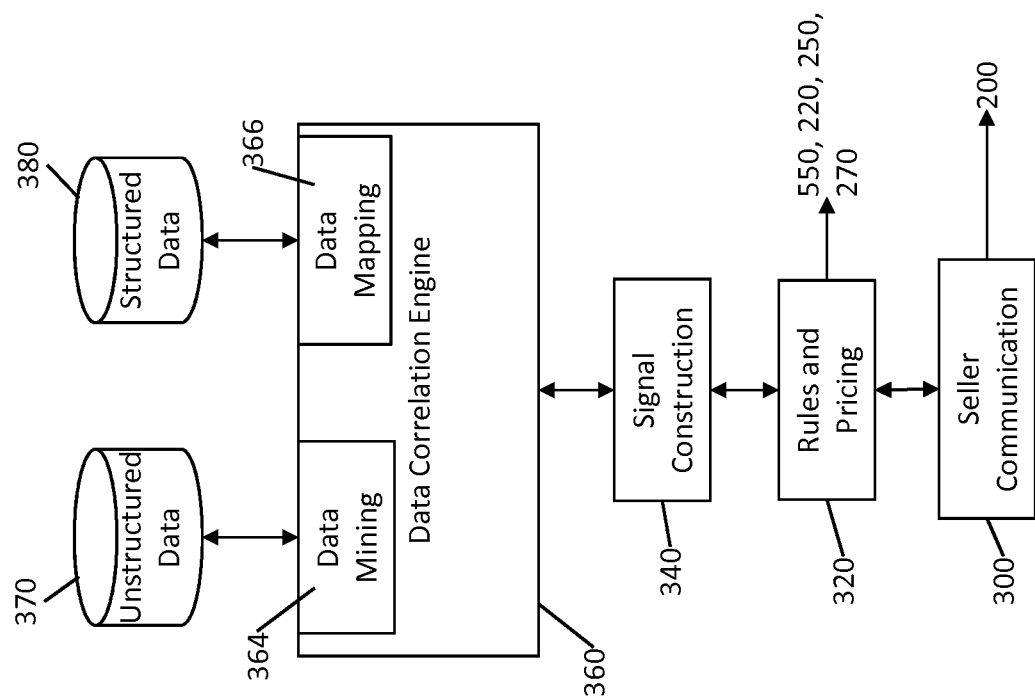
FIG. 1 is a schematic diagram of an embodiment of the invention illustrating aspects of a correlation engine.

Referring now to the drawings in general, the illustrations are for the purpose of describing a preferred embodiment of the invention and are not intended to limit the invention thereto.

The present invention provides methods and systems for using buying and selling distributed data through a virtual marketplace or exchange using signals or indicators that represent the data without disclosing the data, and including at least one data correlation engine that is operable for processing the signals to generate at least one correlation value relating to a specific objective for signal buyers corresponding to the behavior of the object and/or the activity and/or the event.

The present invention systems and methods provide for generating signals from locally controlled and isolated sources for indexing, correlation, discovery and use in a federated model with a multiplicity of other signals and participants or for external objects, events, activities and behaviors to inform indexing and correlation of locally held data in a federated data model, and/or for external objects, events, activities and behaviors to inform indexing and correlation of locally held data in a federated data model.

By way of background, creators of signals are the sellers of information. The content of a seller's information based upon an historical interaction with one or more events, objects or activities that correspond to the behavior of a multitude of objects. Sellers of data or information have multiple requests to share their information. Signals or indicators are a mechanism to share derived information without disclosing the raw data. The value of any asset is highly correlated to the price that buyers are willing to pay.

There is a longstanding and unmet need for providing an automated, virtual signals data marketplace or exchange where signal creators (also the signal sellers and/or signal owners) selectively provide information of interest to signal buyers for defined uses, while protecting the underlying data and maintaining the control of the signal seller through its usage within a network-based, distributed data exchange where economic value of the data, as derived from its use, is the central pricing mechanism within agreements between the sellers and buyers. Nothing in infinite supply can have a price. Data may theoretically have an infinite value, but once it is shared, further dissemination is hard to prevent, thus the value of data quickly diminishes once it is shared. It is an objective of the signals exchange marketplace to create a market for data within a signal or indicator framework, which protects the underlying data that the signals or indicators represent. This signals metaphor allows each signal or indicator provider/owner/seller the ability to construct, control and price their signals and protect further dissemination of both the signals, as well as the underlying data and constrains use of the data for defined objectives.

As illustrated in the various figures, the present invention provides systems and methods for processing signals in a virtualized or cloud-based computing system, including at least one correlation engine for processing the signals. The correlation engine defines what how signals correlate to objects, events, activities, behaviors and other identifiers. In other words the correlation engine assists buyers, sellers and the market which signals are best for which requests. While the correlation engine does not structure data, the signals are constructed and corrected with input from internal and external data as well as locally held object behavior estimators, object state estimators and signal response management. By way of example, a correlation engine is described within U.S. Pat. No. 5,504,839 for "Processor and processing element for use in a neural network" by inventor Mobus, filed Aug. 29, 1994, which is incorporated herein by reference in its entirety.

In systems embodiments for processing signals in a virtualized or cloud-based computing system according to the present invention, the following components and their relationships are provided: a distributed data system having a remote server computer constructed and configured for network-based communication with a marketplace and or a multiplicity of distributed computers, wherein the remote computer server includes at least one data correlation engine operable to generate at least one correlation from at least one internal signal as it relates to at least one object, event, behavior, state or activity. The remote server computer which automatically generates a signal index associated with the at least one signal, wherein each of the at least one signals corresponds to a behavior of an object, state of an object, an activity, and/or an event, wherein the signal index includes a values that associate the at least one signal with one or object, event or activity identifiers and other data held externally by at least one other distributed computer for a predetermined signal use; wherein the at least one data correlation engine is operable for processing the signals to generate at least one correlation value relating to a specific objective for signal buyers corresponding to the behavior of the object, state of an object, activity, and/or the event; and wherein the signal(s) are transmitted to the signal buyers for the predetermined signal use/purpose by the signal buyers without providing underlying data from which the signal(s) were created.

Additionally, the system may further include an object state estimator operable for creating estimates of object state within a distributed signals environment and/or an object behavior estimator operable for creating estimates of object behavior within a distributed signals environment for the at least one object.

Preferably, the at least one correlation engine is operable for the following additional functions: automatically discovering, identifying, and/or selecting a subset of a multiplicity of signals having relevance toward an object and/or a behavior objective; automatically ranking a multiplicity of signals having relevance toward an object and/or a behavior objective provided by the signal buyer(s); and/or automatically estimating the correlation value for the signal(s) with respect to a target objective, object, and/or behavior, and generating a price for each of the signal(s); and/or identifying or recognizing limitations on signal(s) availability by the corresponding signal owner(s) to signal buyers and/or to a signal marketplace based upon a rules engine that automatically considers buyer identity, campaign type, signal requested, price, redemption signal type, purchase quantity, past performance of signal, past performance of campaign type, past performance of buyer, and combinations thereof.

Preferably, the at least one data marketplace correlation engine works in conjunction with a plurality of distributed data correlation engines associated with the distributed signals and their owners. More particularly, the system includes at least one centralized correlation engine and at least one distributed correlation engine for identifying signals relevant to the signal buyer objective(s) based upon a centralized correlation, a localized correlation, a signal history, an external object state, environmental data, and/or an external object behavior.

In methods embodiments, the method steps include: providing a distributed data system having a remote server computer constructed and configured for network-based communication with a multiplicity of distributed computers, wherein the remote computer servers include at least one data correlation engine which is operable to generate at least one correlation from at least one internal signal as it relates to at least one object, event, behavior, state or activity referencable by a buyer. The remote server computer which automatically generates a signal index, which associates the at least one signal with one or more signals and activities referencable by at least one other distributed computer or centralized marketplace, wherein each of the at least one signals corresponds to a state and/or a behavior of an object and/or an activity and/or an event, wherein the signal index includes a signal value for a predetermined signal use; the at least one data correlation engine processing the internal and external signals to generate at least one correlation value relating objects, events, behaviors, and states to other objects, events, behaviors and states held by a multiplicity of signal owners; and wherein each correlation is maintained for each specific objective of either signal buyers or sellers; providing the signal(s) to the signal buyers permitting the predetermined signal use/purpose by the signal buyers without providing underlying data from which the signal(s) were created; and modifying the at least one correlation value based upon feedback from actual signal use by the signal buyers or other parties that act on signal data. Additional steps may include: receiving a feedback corresponding to the state, behavior, activity, and/or the event; automatically adjusting the correlation value(s) for the signal(s) based on the feedback; updating the signal index to include the feedback; receiving information about the at least one signal from corresponding signal owner(s) and automatically generating and/or calculating behavior correlation data from the at least one data correlation engine; outputting the behavior correlation data for correcting, adjusting, and/or modifying the at least one correlation value via a feedback loop including results from using the signals for the predetermined signal use and/or purpose; the at least one correlation engine automatically discovering, identifying, and/or selecting a subset of a multiplicity of signals having relevance toward an object and/or a behavior objective; the at least one correlation engine automatically ranking a multiplicity of signals having relevance toward an object and/or a behavior objective provided by the signal buyer(s); the at least one correlation engine automatically estimating the correlation value (for the signal(s) with respect to a target objective, object, and/or behavior) and generating a price for each of the signal(s); receiving information from signal buyers confirming compliance with the predetermined signal use; automatically matching the indexed signals with distributed signal buyers; providing at least one centralized correlation engine and at least one distributed correlation engine for identifying signals relevant to the signal buyer objective(s) based upon a centralized correlation, a localized correlation, a signal history, an external object state, environmental data, and/or an external object behavior; and/or, the at least one correlation engine identifying and/or recognizing limitations on signal(s) availability by the corresponding signal owner(s) to signal buyers and/or to a signal marketplace based upon a rules engine that automatically considers buyer identity, campaign type, signal requested, price, redemption signal type, purchase quantity, past performance of signal, past performance of campaign type, and/or past performance of buyer.

Also, in the step of outputting the behavior correlation data for correcting, adjusting, and/or modifying the at least one correlation value via a feedback loop, including results from using the signals for the predetermined signal use and/or purpose, the feedback loop includes at least one participant selected from the group consisting of: data buyer, advertiser, advertising campaign manager, broker, publisher, consumer, retailer, behavior tracker, behavior observer, and/or redemption manager.

Importantly, signals function like metadata to the marketplace, and for correlation. The signals include information about events, object state, object behavior, recency, behavior frequency, and/or behavior affinity, and includes a signal type selected from the group consisting of: state signals, event signals, activity signals, behavior signals, relational signals, location signals, loyalty signals, purchase signals, social signals, performance signals, and combinations thereof. Significantly, this remote data correlation is shared with the centralized marketplace to assist with buyer discovery and object feedback. Third party observers thus participate in the marketplace to provide feedback on objects, which may be covered within a multitude of agreements between a multitude of sellers and buyers. Observers are entities that can attest to object state, behavior, activities or events. Observers may not be direct party in the buyer and seller agreements. It is an aspect of the current invention that the buyer and the marketplace will provide for the participation of external parties acting as observers. Thus the present invention provides for the interaction of third party observers across the entire marketplace of participants. The system provides incorporation of observations and feedback corresponding to the behavior, the activity, and/or the event, and then the correlation engine(s) automatically adjust the correlation value(s) for the signal(s) based on the feedback; then the system operates to update the signal index to include the feedback. Signal feedback is used by the systems and methods of the present invention to correct estimated behaviors, correlations, and states in a federated signals environment. By way of example and not limitation, observer attributions may be have different weight, value or trust to different participants. In competitive situations, some observers are economically incented to provide erroneous data to a defined buyer. Thus it is an aspect of the present invention to provide for a reputation of all participants and signals and to incorporate reputation information in the mechanism to adjust signal correlation, indexing, object behavior estimation and object state estimation.

In the case of synthetic signals, the signals may be directly derived, constructed, or generated from signal owner raw data (including data sourced by the signal seller) and/or synthetic signals may be constructed from at least one signal or a multiplicity of signals, i.e., one or more signals are used to construct additional signals, so the synthetic signals are not directly associated with the underlying raw data. The signal owner raw data includes everything they have internally, and everything they have purchased. For example, a farmer buys weather data, and combines with seed performance data to be sold to signal buyers such as genetic seed manufacturers or commodities brokers on the Chicago Mercantile Exchange for the purpose of estimating crop yield.

Figure 2:
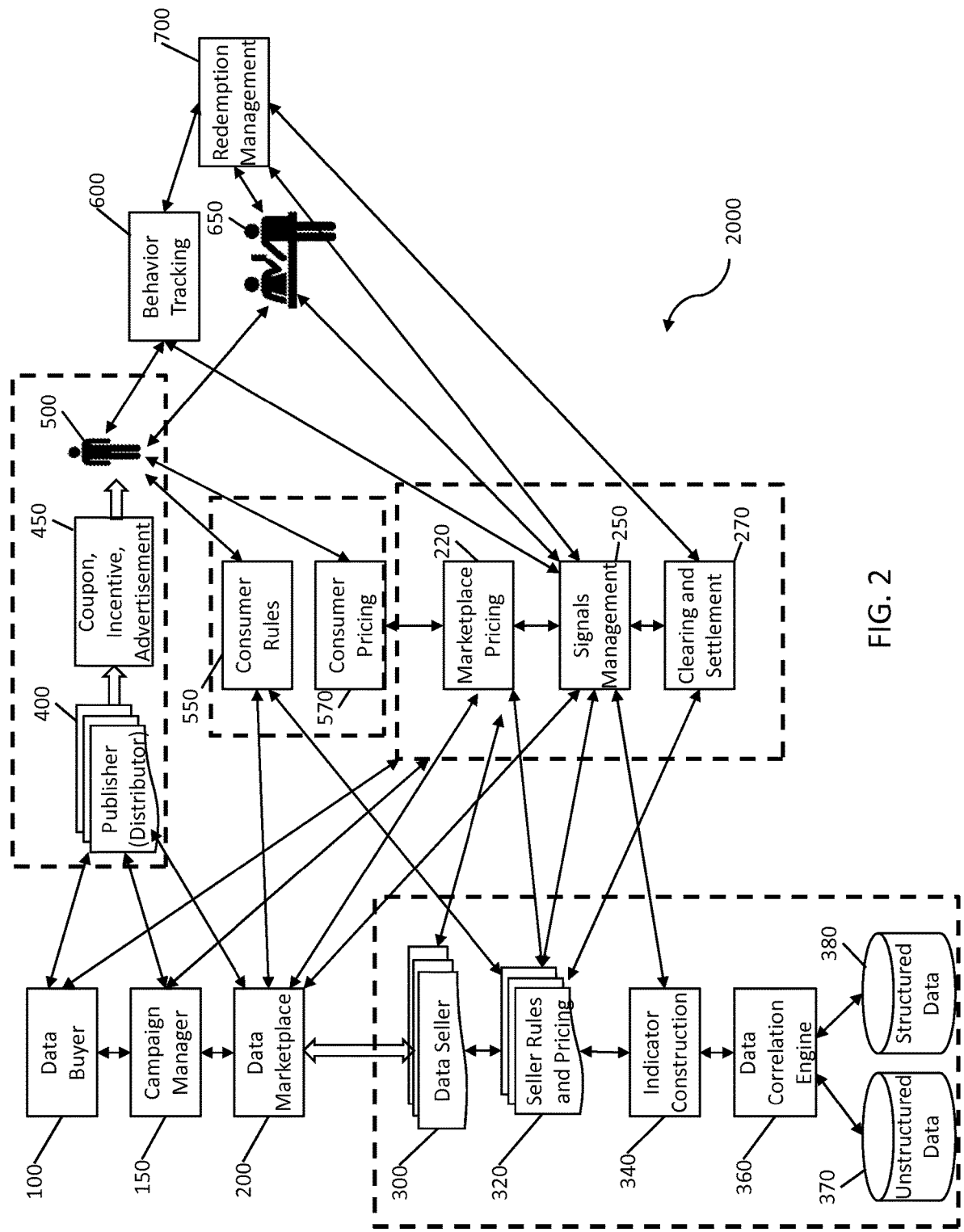
FIG. 2 is another schematic diagram of an embodiment of the invention.
Figure 3:
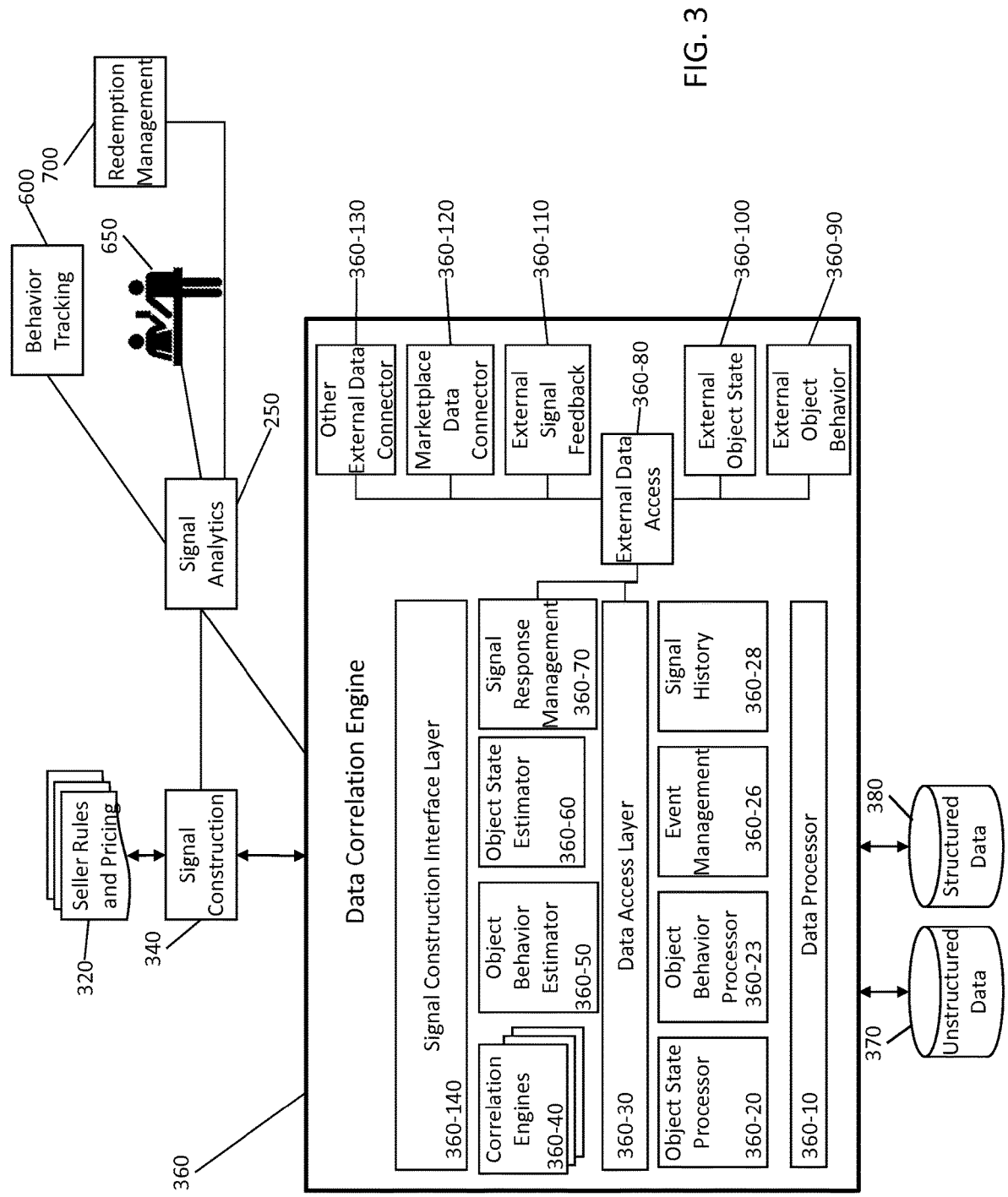
FIG. 3 is another schematic diagram of an embodiment of the invention including illustration of a correlation engine within the system.

Referring now to the figures, in particular, FIG. 1, FIG. 2, and FIG. 3, at least one distributed data correlation engine 360 is illustrated for processing signals from at least one source 370, 380 within a system having at least one buyer 100 and at least one feedback from a behavior measurement 600 to provide toward a specific objective (such as, by way of example and not limitation, an advertising campaign). A distributed data correlation engine within any given node of the system is illustrated in FIG. 3, and includes: an object state processor 360-20 and/or object behavior processor 360-23 for creating signal state data from at least one data processor 360-10, and calculating behavior correlation from at least one correlation engine 360-40; leveraging external data 360-80 to correct the correlation through feeding back from the behavior tracking 600, and other external observation, which adjust values within at least one correlation engine 360-40, object state estimators 360-60 and object behavior estimators 360-50. The system is further operable for receiving signal data from at least one seller 300; calculating behavior correlation data through one or more correlation engines 360-40; and outputting the behavior signal data for correcting the correlation through feeding back results of the signal from feedback providers, which include, by way of example and not limitation, campaign manager 150, publisher 400, consumer 500, behavior tracking 600, retailer 650 and/or redemption management 700.

The present invention also provides for at least one correlation engine operable in conjunction with neural network services within the object behavior estimator and object state estimator for discovering relevant signals toward an object and/or a behavior objective through a neural network (FIG. 3) operating within a distributed signals environment, as illustrated in FIG. 2. By way of example and not limitation, historically when a person (Joe) travels to Chicago he has historically flown by United Airlines, stays at a Marriott, and eats at a steak chain restaurant for dinner. This information is held by many signal sellers such as airlines, credit card companies, hotel chains, mobile phone companies, etc. Thus the object Joe has behaviors that are correlated to travel to Chicago. In this example, the airline observer would correlate their historical travel data on passenger travel to Chicago for object Joe and return information regarding the recency and frequency of Joe's travel to Chicago. An object behavior estimator could further predict the future travel based not only on an airline observer's historical data, but their data correlated to external data such as a business conference, or another objects actions and behaviors (e.g., Joe always travels with Susan to Chicago), or the presence of Joe's computer in an airport as observed by a Wi-Fi hot spot. To summarize, the statistical machines within the data correlation engines and the estimators provide correlation of internal data to external objects and behaviors, and the reputations of the source. These systems follow the pattern of a neural network and allow for prediction of future state and behavior to external stimuli, with internal information protected by the signals construct.

Figure 4:
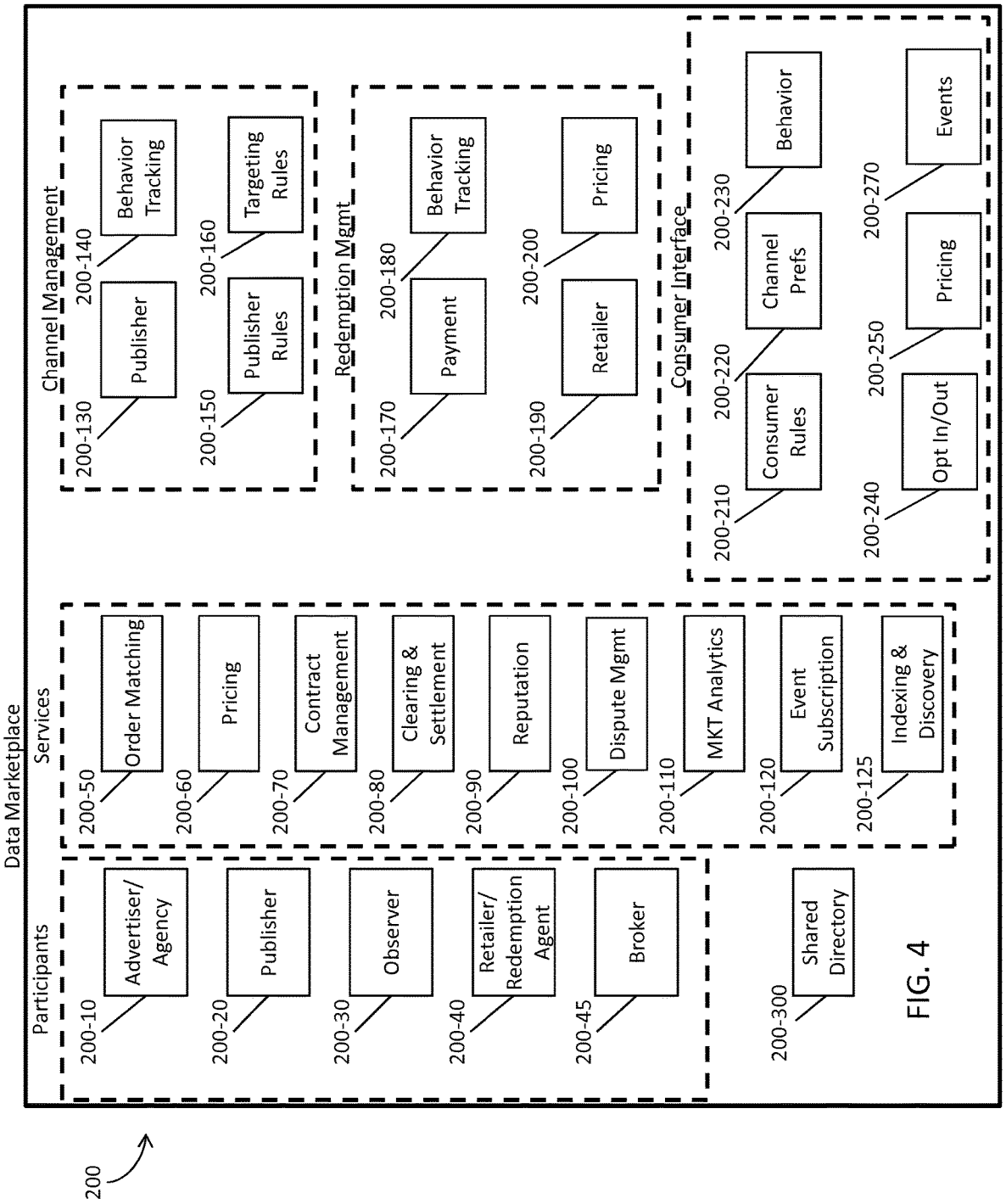
FIG. 4 is a schematic diagram of an embodiment of the invention illustrating components and functions of the signals data marketplace.
Figure 5:
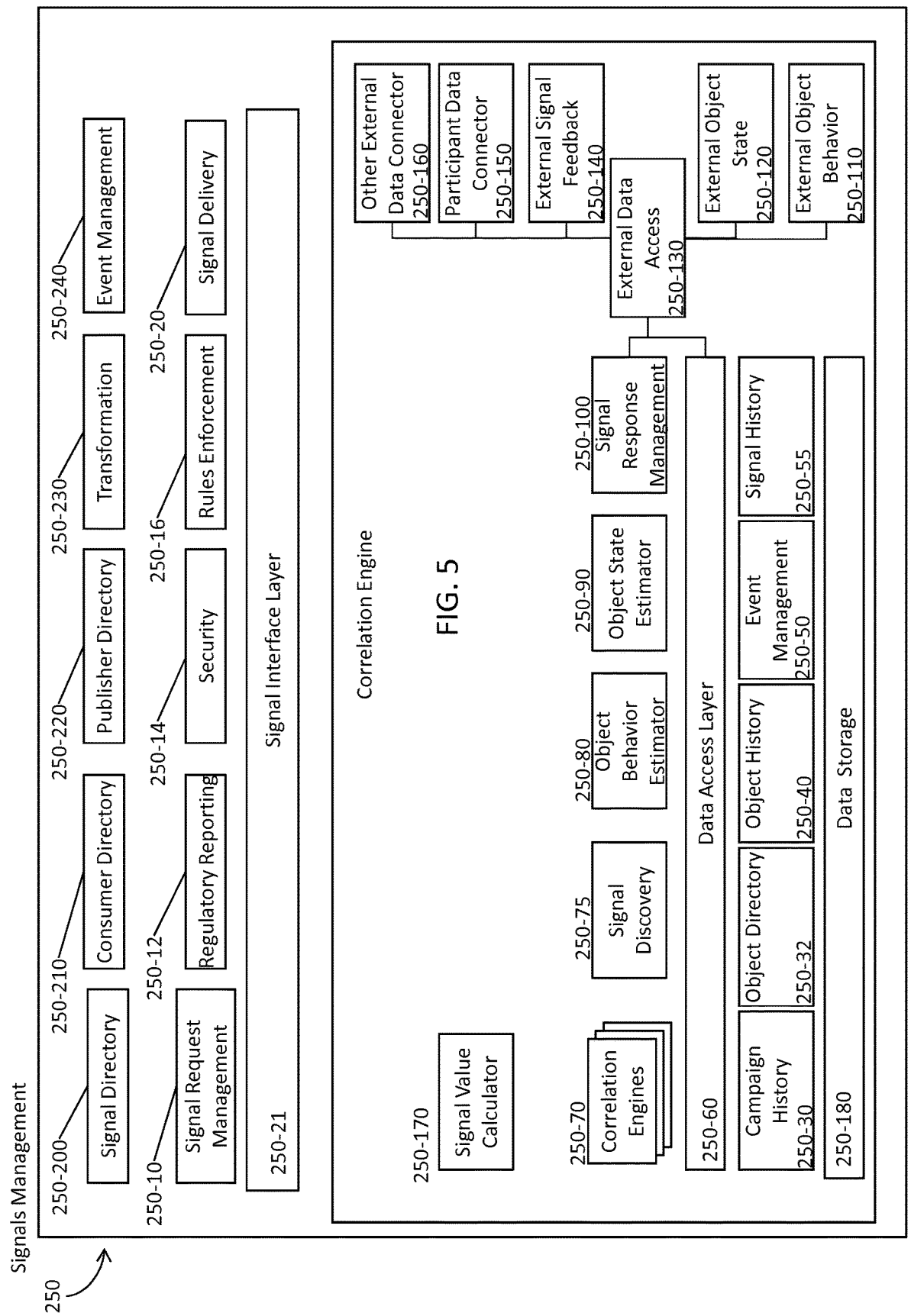
FIG. 5 is a schematic diagram illustrating signals management for the present invention.

In FIG. 4, signals management within the virtual marketplace in one embodiment of the present invention provides for pricing distributed signals based upon their projected value for a given use as determined or calculated by a marketplace server computer, and based upon the recent value of remote signals, demand for object information, campaign performance, buyer reputation and correlation of a multitude of remote signals to other marketplace data including: signal history, campaign history, previous object observations, previous events, estimated object behavior estimated object state, external observer and environmental feedback. As illustrated in FIG. 5, pricing distributed signals based upon their actual value delivered is calculated by the signal value calculator 250-170 within the marketplace analytics or signal management (generally referenced 250). The signal value calculator 250-170 is operable to evaluate the value delivered by matching remote signals delivered by signal sellers with observations source from observers. Marketplace services Embodiments of the present invention to record and attribute a multitude observations for a multitude of campaigns exchanging and using a multitude of signal sellers include: behavior tracking 600, redemption management 700 and retailers 650 against signal history 250-55 for determining what signal delivered and/or weighted value in the change in consumer behavior. This is a percentage of sales model.

Still referring to FIG. 5, price optimizing signal selection within a federated signals environment is provided based upon centralized signal correlation engines 250-70, and signal history 250-55; use of centralized signal correlation engines 250-70 within a federated signals environment is provided to identify relevant signals based upon local correlation 360-40 and/or centralized correlation 250-70, market signal history 250-55, external object state 250-120, external object behavior 250-110 and other market external signals feedback 250-150, and market signal history 250-55.

In systems and methods of the present invention, a neural network leveraging distributed signals is provided, and operable for generating and/or calculating predicted object state and/or behavior. The distributed signals-based neural network further includes both a remote and centralized systems for estimating object state and object behavior estimators forming a network. The object state and object behavior estimation network can be used improve correlations and predict behaviors and states of objects based upon observations, events, behaviors, activities. A marketplace neural computer having at least one correlation engine, at least one object estimator, and at least one mechanism for external observation is used to aggregate remotely held correlations, estimations, observations, and statistical models. The remote neural computer predicts objects state and behavior based data held remotely. The marketplace neural computer predicts the relationship of object state and behavior to signals based upon the aggregate of participant predictions, models, history, and observations. Importantly, the marketplace neural computer is dependent on a multitude of remote data within relevant participants to operate. In other words the marketplace neural computer does not hold the signal payload, or raw data, but rather aggregated relationship of signals to objects, behaviors, and activities. The present invention further includes an object behavior estimator for creating an estimation based upon an input; the object behavior estimator functions to provide prediction where correlation exists between one or more objects, activities, states, behaviors or other signals. The provides for estimation of and object, activity, or behavior of the first type signal which subsequently can be used as a predictor of an episode of a second type, and so on.

Marketplace statistical systems within signals management 250 provide for the correlation of signals, the estimation of value, the estimation of state, the estimation of behavior, and so on. Correlation engines relate the historical and predicted performance of signals both in isolated and combined usage, thus retaining the ability to assess value for a single signal within the marketplace and its participants. In addition to combining signals, the marketplace statistical engine also includes random samples of other signals. When two or more signals are used toward an objective it is statistically necessary to vary the use of signals in order to properly calculate their performance, covariance and other correlations. The marketplace varies use of signals by altering their content, weighting, and presence or adding other signal information. By way of example and not limitation, an Italian restaurant wishes to advertise after the showing of a movie at a movie theater. The movie theater has a signal LEAVING MOVIE THEATER for a given object, or consumer. The campaign manager that manages the advertising campaign for an Italian restaurant finds the movie theater signal of use, but must gain additional information to determine which consumers leaving the movie theater prefer Italian food. The campaign manager requests AFFINITY to ITALIAN FOOD for a given object or consumer from the consumer's bank and the same signal from an Italian Food magazine. By varying the AFFINITY to ITALIAN FOOD use signals from the bank and the magazine, and including random signals, the statistical performance, correlation, and covariance of the bank signals, the magazine signals, and other prospective signals can be easily calculated within the marketplace signal management. Thus, signal sellers are required to support signals management driven requests for any registered signal data to assess the cross correlation of signals. Such random signals are anonymized to protect the anonymity of the signal source and content. Random sampling is also used to assess the unique performance of specific signal types, and identify and or update correlations, prediction, estimations and interdependencies of signals, object, events and behaviors. In this way the random samples allow the marketplace to update correlations and indices in a way which allows for automated identification of alternate data sources which may improve price-performance of a given objective.

In one embodiment of the present invention a behavior estimator is provided. A behavior estimator is a unique linear, multi-staged adaptive filter which models a synaptic processor. The multistage filter is a sequence of interacting processes which interact with defined stimuli or signals. Processes are impacted by other processes, other signals, environmental forces and most importantly the history of process patterns within any given object. The behavior estimator is a computational model of principles seen in the biological model. It produces a response to the current primary input which is proportional not only to that input, but also to both the history of the input and, optionally, the history of secondary correlated inputs. By way of example, a synaptic processor within a neural network is described within U.S. Pat. No. 5,504,839, referenced and incorporated supra. This device is the basis of a new machine learning approach that addresses a critical problem in the construction of autonomous and/or automatic or intelligent agents within a federated data and distributed signals environment.

The present invention further includes methods, systems, and apparatus embodiments for object estimation and/or data processing. In one embodiment of the present invention, a mechanism to estimate object state may be determined by a distributed Kalman filter, using distributed data processing techniques. By way of example, Kalman filtering techniques are described in WIPO International Publication No. WO1988001409 for "Distributed kalman filter" by inventor Hubert Chin, filed Aug. 10, 1987, which is incorporated herein by reference in its entirety. Kalman filtering techniques have been developed primarily for estimating state parameters in dynamic systems; they have been used in many applications, such as control systems, where real time measurements are not possible. The Kalman filter, also known as linear quadratic estimation (LQE), is an algorithm that uses a series of measurements observed over time, containing noise (random variations) and other inaccuracies, and produces estimates of unknown variables that tend to be more precise than those based on a single measurement alone. More formally, the Kalman filter operates recursively on streams of noisy input data to produce a statistically optimal estimate of the underlying system state.

The distributed Kalman filter network includes a state processor. The distributed Kalman filter also preferably includes means for combining input signals having noise with a first state vector and an object present state vector to produce a derivative state vector, and means for integrating the derivative state vector to produce the object present state vector, and means for combining a second object present state vector in the first combining means.

Furthermore, the Kalman filter is a widely applied concept in time series analysis used in fields such as signal processing and econometrics. The algorithm works in a two-step process. In the prediction step, the Kalman filter produces estimates of the current state variables, along with their uncertainties. Once the outcome of the next measurement (necessarily corrupted with some amount of error, including random noise) is observed, these estimates are updated using a weighted average, with more weight being given to estimates with higher certainty. The method utilizes various mathematical multivariate structural time series models and applies Kalman filters where appropriate. The mathematical multivariate structural time series models are enormously powerful tools which open the way to handling a wide range of data. A strong feature of time series models used in conjunction with state-space models is the usage of an algorithm for filtering, smoothing and predicting. A state-space model is a two-layer model. An external layer involves an observed process 'y'. This process is assumed to follow a measurement equation:

$$yt=Zt\alpha t+dt+\varepsilon t$$

For each t, yt is a n-vector. The n*m matrix Zt is a matrix of regressors, while at is the regression coefficient. The vectors εt are independent multi-normals with zero mean and covariance Ht. The internal layer involves the unobserved process α. The process is assumed to follow the transition equation:

$$\alpha t=Tt\alpha t+ct+Rt nt$$

Here Tt is an m*n matrix, Rt is an m*q matrix and the components of white noise nt have a multi-normal distribution with zero mean and covariance matrix Qt. The process is initiated with a random vector αo, which has a mean of ao and a covariance matrix of Po. The elements Zt, dt, Ht, Tt, ct, Rt, and Qt are referred to as the system matrices. If the system matrices do not change in time the system is said to be time-invariant or time homogeneous. The system is also stationary for a specific selection of ao and Po.

Once the data has been put in state space form, the Kalman filter may be applied which in turn leads to algorithms for prediction and smoothing. The Kalman filter also opens the way to a maximum likelihood estimation of unknown parameters in a model. This is achieved via prediction error decomposition. Thus, a Kalman filter can be used to access and predict cost of medical services based on acceptable data associated with such services or similar services.

The Kalman filter is a recursive procedure for computing an optimal estimator of a state vector at time t, based on information available at time t. In certain engineering applications, the Kalman filter is important due to on-line estimations. The current value of a state vector is of prime interest (for example, the vector may represent the coordinates of escalating charges from the medical service provider) and the Kalman filter enables the estimate of the state vector to be continually updated as new observations become available.

Another reason for the importance of Kalman filter is that when disturbances and initial state vectors are normally distributed, the Kalman filter enables likelihood function to be calculated via what is known as a prediction error decomposition. This opens the way for the estimation of any unknown parameters in the model. The Kalman filter also provides the basis for statistical resting and model specification.

The Kalman filter is an efficient recursive algorithm for the computation of the optimal estimator at and at, given the information up to (and including) t. A by product is the computation of the error in estimation:

$$Pt=E[(\alpha t-\alpha t)(\alpha t-\alpha t)']$$

Suppose that at time t−1, at−1, and Pt−1 are given. The algorithm then computes the predicted values with the prediction equations:

$$\alpha t/t-1=Tt\alpha t-1+ct$$

$$Pt/t-1=TtPt-1Tt'+RtQtRt'$$

The corresponding predicted yt is $$\hat{y}t=Zt\alpha t/t-1+dt$$

The mean square error (MSE) of the innovation vt=yt−ŷt is $$Ft=ZtPt/t-1Zt'+Ht$$

Once the new observation yt becomes available, the estimates of the state can be updated using the updating equations:

$$\alpha t=\alpha t/t-1+Pt/t-1Zt'Ft-1(yt-Zt\alpha t/t-1-dt)$$

$$Pt=Pt/t-1-Pt/t-1Zt'Ft-1ZtPt/t-1$$

As such the Kalman filter is used in a novel technique to predict costs of medical procedures based on cost information of similar medical procedures. The Kalman filter can be used to accurately estimate a cost of a new medical procedure. The Kalman filter may also be used to predict a MSP's actual cost of an unlisted or unusual medical procedure.

In one embodiment of the present invention for providing a signals marketplace or signal exchange for distributed signal sellers and signal buyers, a method for generating signals from distributed data sources controlled by a multiplicity of owners for selling in a signal marketplace is provided, including the steps of: providing at least one signal from a first data source and at least one signal from a second data source; wherein the signals originate from different distributed data sources controlled by different owners and the signals are registered in a centralized database having at least one correlation engine, and each of the signals is indexed in the centralized database based upon ownership, object relevance, behavior relevance, historical usage, performance, and correlation to other signals and data; and, wherein the value is automatically generated by a remote server computer associated with the remote database, based upon at least two factors associated with the value, and wherein the value includes relevance to a signal buyer and a buyer objective. By way of example and not limitation, the relevance to the signal buyer is based upon at least one objective, with the economic value of the signal based upon the measured performance of at least one signal toward at least one objective by the buyer. Preferably, the at least two factors are selected from: predictive accuracy, fidelity, relevance to an objective, near-real-timeliness, frequency, recency, state of an object, relationship of the source of the signal, reputation of the signal, reputation of the seller, affinity to a target, and/or usefulness to an objective. By way of example and not limitation, the correlation engine(s) function to determine the relevance of a signal to the signal buyer based upon at least one objective may include marketing and/or advertising.

The method may include additional steps including: aggregating the signals; creating a new signal or a synthetic signal from one or more signals from at least one source; linking the indexed signals to relational databases, wherein the signals are locally indexed by each signal owner and/or each seller associated with the signals; the virtual marketplace server computer and/or the owners creating and tracking their corresponding indexed signals; updating the remote and centralized indices of signals; and/or tracking agreements for buying and selling signals.

A system for providing a signals marketplace in a virtualized computer network for generating signals from distributed data sources controlled by a multiplicity of owners includes at least the following components and their relationships with each other: a remote server computer constructed and configured in network-based communication with a centralized database further comprising at least one index for signals data, and operable to automatically generate an assigned value corresponding to each unique signal created by a signal seller within a remote index of signals data; wherein the remote indexed signals data are generated from remote structured and unstructured data. receiving at least one signal from a first data source and at least one signal from a second data source, wherein the marketplace registers remote signals, which originate from different distributed data sources controlled by different owners into a centralized database or signals index; wherein each of the registered signals has a corresponding assigned value stored in the central database and associated with its indexed corresponding remote signal; and wherein each assigned value is based on at least two factors is dependent upon a signal source value and a buyer objective. Preferably, the signals marketplace system automatically recommends signals, and the price for a given usage for both signal buyers signal sellers or signal owners. Additionally or alternatively, the recommended pricing is automatically generated based upon a number of factors, including relevance to an objective, fidelity, near-real-timeliness or recency, affinity, predictive accuracy, and combinations thereof, and/or is negotiated in a bid-response exchange between the owners and buyers.

In the virtual marketplace, purchases of signals are tracked by the owners, sellers, and external observations within the remote server computer, and in the signals marketplace. Signal information is assigned a unique identifier so that it can be properly routed between buyer and seller within active agreements. Tracking of signal performance occurs through feedback obtained by observers, which may include buyers, sellers, publishers, retailers, consumers, payment companies, and/or other third parties; automatically correlating the effectiveness of the advertising campaign using the at least one signal, wherein the correlating step includes an object correlation to other objects and/or object behaviors to other objects and/or a signal correlation to other signals; of providing feedback on the signal usage. The marketplace uses this feedback to update directories, indices, pricing, history, agreements, and correlations to an objective. Also preferably, the signals marketplace centralized server computer automatically tracks and manages signal and participant reputation for communication to other marketplace participants. The signals and their corresponding owners, as well as buyers, brokers, publishers, observers and other participants are registered and registration information is stored in the centralized database associated with the virtual marketplace remote server computer, and the registration information is stored in a shared directory associated with the centralized database.

The present invention also provides an embodiment including a method for creating and using a virtual marketplace for valuing and selling signals generated from distributed data sources that are controlled by a multiplicity of owners, the method steps including: providing at least one signal from a first data source and at least one signal from a second data source to a remote server computer for a signal marketplace or exchange; wherein the signals originate from different distributed data sources controlled by different owners and the signals are indexed and listed in a centralized database and each of the indexed signals is linked to corresponding relational databases; and wherein a value for each centralized indexed signal is automatically generated by the remote server computer associated with the seller where terms of use have been agreed. The value of the signals is controlled by the seller and based upon at least two factors associated with each value, the at least two factors selected from the group consisting of: event, object state, change in state, behavior of an object, relationship to another object, relationship to a behavior, economic indicators, relevance to an objective, near-real-timeliness, frequency, recency, predictive accuracy, fidelity, reputation of the signal, reputation of the seller, affinity to a target, usefulness to an objective, and combinations thereof. Also, in this method embodiment, as with the systems of the present invention, the marketplace provides for participation and compensation of other parties that observe object behavior, object state or are otherwise capable of providing feedback signals corresponding to a state, behavior, activity, and/or an event. This observer feedback informs the agreements, economic value of the signals, object preferences, calculated correlation of signal information, environmental projections and other marketplace functions. The economic value of the observation can be calculated by the marketplace, and these observation feedback signals can be indexed and purchased within the marketplace. Advantageously, the listed index provides for automated matching with buyer candidates having corresponding objectives for buying signals and signals data, and wherein the objectives include consumer state, events and behavior(s). Additional method steps include: the step of automatically updating the listed index and/or creating new listings; receiving a defined use and an agreement to report on a result of use by a registered buyer with the server computer; releasing signal data to a registered buyer based upon the agreement between the signal owner and the registered buyer; monitoring performance of the at least one signal compared with a corresponding objective; automatically determining a relevance to an objective for the at least one signal based on comparison with consumer feedback and consumer behavior; and/or limiting signal availability based upon a rules engine that automatically considers buyer agreement, identity, campaign type, signal requested, price, redemption signal type, purchase quantity, past performance of signal, past performance of campaign type, past performance of buyer; automatically correlating how the value of the information decays over time and with respect to relevance to the objective; and combinations thereof.

According to the present invention, the signal owner controls how the at least one signal is created, generated and/or constructed and how the at least one signal is used by the buyer, although for facilitating the virtual marketplace or exchange between signal sellers and signal buyers, preferably the at least one signal includes a signal type selected from the group consisting of: event signals, activity signals, behavior signals, performance signals, relational signals, location signals, loyalty signals, purchase signals, social signals, and combinations thereof.

Methods of the present invention further include the step of generating a value of signal relevance to the objective based upon signal feedback, object behavior, object state, and/or consumer reputation; and, more particularly, wherein the value of the at least one signal depends upon the time of the at least one signal from an event occurrence, and wherein the value of the at least one signal decays over time. Also, the methods include the step of automatically correlating how the value of the information decays over time and with respect to relevance to the objective.

Preferably, the virtual marketplace or exchange server computer receives feedback from the buyers and observers regarding qualities of relevance, correlation, and/or strength of each of the at least one signal. In preferred embodiments of the present invention, a signal quality and a signal reputation are automatically generated by the virtual marketplace based upon an assessment of signal performance compared with an objective and/or based on the feedback received.

The present invention virtual data marketplace for signals is built on the framework of creating signals or indicators by their corresponding signal owners or signal sellers, the method steps performed by a signal owner include: constructing at least one signal associated with a behavior of an object and/or an activity and/or an event associated with the object in a signal owner computer that is constructed and configured for network-based communication with a remote server computer, wherein the at least one signal based upon at least two factors associated with each value, the at least two factors selected from the group consisting of: event, object state, change in state, behavior of an object, relationship to another object, relationship to a behavior, economic indicators, relevance to an objective, near-real-timeliness, frequency, recency, predictive accuracy, fidelity, reputation of the signal, reputation of the seller, affinity to a target, usefulness to an objective, and combinations thereof; generating a first value for each of the at least one signal; and tracking usage of the at least one signal. Also, the at least one signal provides a feedback corresponding to the behavior, state, activity, and/or the event. Additional steps include indexing the at least one signal; listing the indexed signals in a remote database associated with the remote server computer; communicating the remote index signal to the centralized data marketplace signal index, wherein the centralized signal index listing provides for automated discovery and matching with buyer candidates having corresponding objectives for buying signals and signals data, wherein the objectives may include object behavior(s), activities, performance, and/or events; and updating the listing of the indexed signals by the signal seller or signal owner.

The at least one signal includes a signal type selected from the group consisting of: event signals, activity signals, behavior signals, relational signals, location signals, loyalty signals, purchase signals, social signals, and combinations thereof. Signals are generated or constructed from both structured and unstructured data. Significantly, each signal owner controls how the at least one signal is created, generated and/or constructed; in embodiments of the present invention, methods of the present invention provide steps wherein signals or indicators are created by the signal owner transforming its own data into the signals or indicators through steps of automatically organizing structured data, unstructured data, external data 360-80 based upon historical patterns, external usage, external feedback, external object observations, locally maintained correlation engines, centrally managed correlation engines, signal response management, and object estimators. In constructing the at least one signal or indicator, preferably the signal seller (or its system and seller correlation engine) automatically determines a relevance to an objective from historical performance and including external observations and feedback on object state, activity or behavior.

While the definition and construction of the signal is at the discretion of the Seller, generally signals conform to a common signal structure whose elements are named and formatted to marketplace conventions for the purpose of creating a common taxonomy for exchange of signal information. In the case of a signal exchange within a signals marketplace, but also for exchange outside of a marketplace, the signal structure provides for secure and reliable transportation and translation of an information payload contained with a signal. The signal construct defines the source, the destination, the delivery channel, the method for securing the data, the agreement under which the data is exchanged, a transaction identifier, a transaction time, information necessary to confirm receipt, template which describe the message type, and the payload of the message. Sellers and buyers use the signals construct to create, register, publish, discover, assess, sell, manage, and measure data exchange according to the systems and methods of the present invention. Signal types include both buyer-initiated and seller-initiated signals; some examples follow for illustration purposes, but are not intended to limit the claimed invention thereto.

Buyer Initiated Behavior Signal (BIBS). Behavior signals are published by sellers which observe object behavior. For a given buyer initiated behavior signal, the buyer of a behavior signal requests behavior signal from seller for a given event, object or category of objects. The content of the seller's signal is based upon an historical interaction with one or more events, objects or activities that correspond to the behavior of an object. To obtain the seller's signal, the buyer must provide a reference point for the seller to create the behavior signal. In this model it is the request of the buyer triggers the exchange of data. For a given reference point, the seller's signal describes a behavior such and such information as the recency and the frequency of the behavior. By way of example and not limitation, a behavior name is illustrated by "Travel-To [Variable]". The buyer initiates the request and seeds the reference point variable for the signal. Each buyer could pay a different price depending on the value they derive from the signal.

Buyer Initiated Event Signal (BIES). Event signals are published by sellers which observe events. For a given buyer initiated event signal, the buyer of an event signal requests objects, or categories of objects from seller that have a relationship to a given event. The content of the seller's signal is based upon an historical interaction with one or more events, objects or activities that correspond to an event. To obtain the seller's signal, the buyer must provide a reference point for the seller to create the event signal. In this model it is the request of the buyer triggers the exchange of data. A signal request is initiated by the buyer asking the seller if a given reference event has occurred. The signal response can contain information on the event, objects within the event, recency, frequency, location, as well as specifics surrounding the event. By way of example and not limitation, consider "movie purchases in Cincinnati Ohio in last five minutes" as a signal request of this type, each buyer could pay a different price depending on the value they derive from the signal.

Seller Initiated Behavior Signal (SIBS). In this case the seller is initiating (or publishing) that a behavior has occurred. The content of the seller's signal is based upon a current or historical interaction with one or more events, objects or activities which correspond to the behavior of an object. The signals can be published to one or more buyers, and prospective buyers as the activity occurs. Each buyer could pay a different price depending on the value they derive from the signal. By way of example and not limitation, consider "consumer [CONSUMER_NAME] is shopping in [Location]" as a signal.

Seller Initiated Event Signal (SIES). Seller is publishing an event to one or more buyers. The content of the seller's signal is based upon a current or historical interaction with one or more events, objects or activities which correspond to the behavior of an object. From a software design perspective, this model is consistent with software based publish/subscribe paradigm. Within commerce signals buyers "subscribe" to an event made known by the seller. Each buyer could pay a different price depending on the value they derive from the signal. The seller initiates the signal, and can communicate specifics about the event. By way of example and not limitation, consider "consumer [CONSUMER_NAME] purchased movie ticket" as a signal.

The signals may be directly derived, constructed, or generated from signal owner raw data (including data sourced by the signal seller) and/or synthetic signals may be constructed from at least one signal or a multiplicity of signals, i.e., one or more signals are used to construct additional signals, so the synthetic signals are not directly associated with the underlying raw data. Once again, signals or indicators according to the present invention are generated or constructed from both structured and unstructured data of the signal owner. Similarly, a consensus signal or a generalized signal from one or more signals. Note that the method steps of the present invention are made for a multiplicity of signals and corresponding signal owners, in particular in the case of distribution in the context of a virtual marketplace or exchange for signals.

Preferably, after constructing signals, their distribution or sale to buyers is controlled by the signal owner and rules governing seller signals or owner signals that provide for limiting signal availability based upon a rules engine that automatically considers buyer identity, campaign type, signal requested, price, redemption signal type, purchase quantity, past performance of signal, past performance of campaign type, past performance of buyer, and combinations thereof. The rules engine resides within a remote computer of the signal seller and is communicated through a distributed network, either directly and/or within a virtual marketplace having a centralized rules engine governing the management of the exchange of signals for a multiplicity of signal sellers and signal buyers.

Signal value cannot be established conclusively independently of a signal buyer's objective. Additionally the value of any of the signals depends upon signal relevance to the objective based upon a multiplicity of factors, including feedback such as time from last observation and/or interaction, effectiveness of consumer interaction, depth of interaction, consumer feedback, buyer behavior, and/or consumer reputation. The signal seller correlation engines provide options for automatically correlating how the signals or indicators relate to data held within the signal seller to data external to the signal seller. The present invention also provides an embodiment including a method for adjusting the correlation of data with time and with respect to relevance to the objective(s) of buyers. Significantly, regardless of the objectives, generally the value of the signal(s) depends upon the time of the signal construction from an event occurrence, wherein the value of the signal decays over time. Also, the present invention provides for the economic value of the signal to decay over time. By way of example and not limitation, consider a signal "Consumer [ID] Purchased Movie Ticket at TIME". This signal has relevance to a buyer's objective which is dependent on time since the observation. In other words a signal has a higher relevance if it is one second old, and a lesser relevance as time progresses. The economic value of a signal is in proportion to its relevance, hence the value of the signal is also higher if the signal is one second old, and a lesser value as time progresses.

Feedback is a form of signal sourced from observers of objects. Observers typically have no need to maintain historical information, but rather report on current object state or activity. By way of example and not limitation, consider a Wi-Fi hotspot at LOCATION that has a current request for access from COMPUTER_ID. If the objective of a signal buyer was for COMPUTER_ID presence at LOCATION, then this observation is relevant to the buyer. Furthermore, the process of receiving feedback from observers, pertaining to object state, activity, performance and behavior, provides a mechanism to assess and adjust performance of marketplace participants, marketplace systems, signals and campaigns operating within a federated data marketplace. And so evolving the at least on signal based upon the feedback received is an additional step in methods of the present invention. Additionally, a signal quality and a signal reputation is automatically generated (by the correlation engine of the signal seller and/or by the signal marketplace or signal exchange) based upon an assessment of signal feedback. The signal feedback may provide information useful for evaluating performance of the signal compared with the buyer's objectives; the virtual marketplace will determine what feedback is relevant toward any objective.

The present invention provides methods for creating signals or indicators by corresponding signal owners, the method steps performed by a signal owner includes: constructing at least one signal associated with a behavior of an object and/or an activity and/or an event associated with the object in a signal owner computer that is constructed and configured for network-based communication with a remote server computer, wherein the value of the signals is controlled by the seller and based upon at least two factors associated with each value, the at least two factors selected from the group consisting of: event, object state, change in state, behavior of an object, relationship to another object, relationship to a behavior, economic indicators, relevance to an objective, near-real-timeliness, frequency, recency, predictive accuracy, fidelity, reputation of the signal, reputation of the seller, affinity to a target, usefulness to an objective, and combinations thereof; generating a first value for each of the at least one signal; and tracking usage of the at least one signal. Also, the at least one signal provides a feedback corresponding to the behavior, activity, and/or the event. Additional steps include indexing the at least one signal; listing the indexed signals in a remote database associated with the remote server computer, communicating the remote index to the centralized data marketplace signal index, wherein the centralized signal index listing provides for automated discovery and matching with buyer candidates having corresponding objectives for buying signals and signals data, wherein the objectives include consumer behavior(s), events, object states, object performance; and updating the listing of the remote and centralized indices by the signal seller or signal owner.

The content of the seller's signal is based upon the seller's interaction with one or more events, objects or activities. Signals are generated or constructed from both structured and unstructured data, which contain records of interaction. Significantly, each signal owner controls how the at least one signal is created, generated and/or constructed; in embodiments of the present invention, methods of the present invention provide steps wherein signals or indicators are created by the signal owner transforming its own data into the signals or indicators through steps of automatically organizing structured data, unstructured data and external data 360-80 based upon historical patterns, external usage, external feedback, external object observations, locally maintained correlation engines, centrally managed correlation engines, signal response management, and object estimators. While the definition and construction of the signal is at the discretion of the seller, generally signals conform to a common signal structure whose elements are named and formatted to marketplace conventions for the purpose of creating a common taxonomy for publishing, discover and exchange of signal information. By way of example and not limitation, the taxonomy of the at least one signal includes a signal type selected from the group consisting of: state signals, event signals, activity signals, behavior signals, relational signals, location signals, loyalty signals, purchase signals, social signals, and combinations thereof.

The present invention provides for the signal owner selectively sharing signals information with signal buyers in a virtual marketplace or exchange, wherein the signals information includes a unique identifier associating each signal transmitted by an owner and/or signal seller for exchange with a signal buyer and/or signal data marketplace and agreement within which the data exchange was governed. Preferably, the information shared provides privacy protection for the signal owner. Furthermore, each signal includes an defines the source, the destination, the delivery channel, the method for securing the data, the agreement under which the data is exchanged, a transaction identifier, a transaction time, information necessary to confirm receipt, template which describe the message type, and the payload of the message. In any case, the signals or indicators constructed by the signal seller (signal owner) provide the seller with a mechanism to protect the underlying data from which the signals or indicators are derived. Also, in preferred embodiments, additional privacy protection may be provided by at least one of: screening, anonymizing, and/or using hashed values. For example with hashed values, methods provide for matching credit card objects with MD5 hash of a credit card number allowing signal sellers to identify behavior on the match of hash values versus the match of actual credit card numbers; importantly the MD5 hash cannot be easily reversed (except by NSA). Both entities or parties to the transaction are doing consistent hash, but neither one disclose a number. The same methods and systems are used with email hash; it confirms the match, but only discloses the encrypted information.

Systems and methods of the present invention provide for releasing signal data to a registered buyer based upon an agreement between the signal owner and the registered buyer. Before an agreement is generated, the signal seller retains control of the signal data until after receiving a defined use by a registered buyer, which provides one of the key terms for the agreement. Preferably, the agreement also provides requirements for feedback and/or measurement of objective, such as by way of example and not limitation, to report on a result of use by a registered buyer. Also, the release of the signal data is can be either based upon an observance by the seller or by a request of the buyer. In another embodiment, the release of signal data is based upon a trigger. Preferably, the release of signal data or signals to registered buyer(s) is automatic based upon detection of the trigger.

The systems and methods of the present invention also provide for automatically confirming receipt of the at least one signal by a destination or signal buyer(s); this step is achieved by automated messaging generated from the buyer computer and communicated automatically through the network to the seller computer directly and/or to the signal marketplace server computer for tracking the distribution of all signals and associated object identifiers based upon unique signal identifiers and the agreements between signal sellers and signal buyers for predetermined uses of the signals.

As set forth in the foregoing, the construction of signals is provided for use between signal sellers and signal buyers via the virtual marketplace through a network for communication between their distributed computers and a remote server computer associated with the virtual marketplace for signals data. The present invention further provides methods and systems for establishing and using a virtual marketplace for value-based exchange of those constructed signals, wherein the value of the signals is determined in the context of willing signal buyers and signal sellers for the signals. The signals of the present invention are derived from data sources that are owned by a multiplicity of entities and/or individuals, and the signals are abstracted from distributed information and data associated with the multiplicity of entities and/or individuals to protect the underlying information and data. Each entity or individual that sells signals data in the virtual marketplace first converts or transforms their unique raw data (or underlying data) into a "signal" or signals, which are indicators associated with object behavior as observed by their respective owners. Importantly, each distributed data source which is a member of the marketplace may make remote indices and correlations available to the virtual marketplace for the purpose of aiding buyer discovery, matching, clearing and settlement, reputation, identifying data leakage, and performance.

The value of any signal cannot be determined separate from one or more buyers, their objectives, and the corresponding use of the signals toward those objectives. Signal sellers create and define rules in which to sell signals. Rules can be based upon requestor, usage, object, behavior, performance, reputation or any other attribute available in the market. By way of example and not limitation, Barclays Bank will only allow consumer travel signals to be used by approved vendors and with explicit consumer permission for the a hotel reservation use. Buyers have the opportunity to request access to signals within the rules of the marketplace seller, consumer and other regulatory authority. Sellers may choose to accept requests within the terms of an agreement, which is maintained in the marketplace or directly between the two parties. In the case of a signals marketplace or exchange for the signals, the marketplace centralized server computer retains the information on the agreement, signal requests, signal exchanges, feedback, historical data, buyer, seller, seller reputation, signal reputation, price, effectiveness, rules, constraints, and combinations thereof.

According to the present invention, signal creators (signal sellers) or signal owners retain control of their respective data and the signals constructed therefrom, until a registered buyer defines use of the signals, agrees to report on result (by way of example and not limitation, reports on effectiveness for a given use) and other terms, and an agreement is created between buyer and seller. This method for creating and using signals or indicators establishes control, value, and price for those signals between the signal seller and signal buyer(s), and/or the signal sellers and signal buyers who are the participants in a virtual marketplace or signals exchange. The signal supplier or signal seller (or signal owner) controls how each signal is constructed or generated; the underlying data or information owned by the signal seller may be reconstructed or regenerated into more than one signal for use by third parties for different purposes. Marketplace rules govern construction, transmission and tracking of signal information and the associated object throughout their defined use; this allows signals to be correlated to object behavior. Tying signal performance to object behavior and object events subsequently provides for measurement of value and subsequent market based pricing of signals within the virtual marketplace. Object behavior may take the form of feedback from parties, which are external to any given agreement between buyer and seller. This object behavior obtained from external third party observers inform and correct the correlation of signals to objects and behavior within the marketplace. Importantly this correlation is external to information available to either buyer or seller independently. Third party observers thus participate in the marketplace to provide feedback on objects, which may be covered within a multitude of agreements between a multitude of sellers and buyers. Thus the present invention provides for the interaction of third party observers both directly to the signal sellers and across the entire marketplace participants. The signal construct defines the source, the destination, the delivery channel, the method for securing the data, the agreement under which the data is exchanged, a transaction identifier, a transaction time, information necessary to confirm receipt, template which describe the message type, and the payload of the message. The construction of a signal by a signal seller will have varying degrees of relevance to any given signal buyer and that buyer's objective, thus the value of the information and data, as well as the signals generated therefrom, will vary with its correlation and fidelity. This provides a natural feedback loop in the virtual marketplace or exchange. Signals that have poor fidelity or poor correlation with an objective will have poor performance, and thus a correspondingly poor price.

Signal sellers have minimal insight into prospective buyers, and the value of their signals in any given context. Visibility is further limited into competing data. For example, if an advertiser intends to sell hotels to frequent travelers of a predetermined destination, they have the choice of seeking information from flight records, geo location, rental car records, credit card issuers, etc., and combinations thereof. Buyers of information also have interests to optimize price for a given performance or quality of correlation. If a signal buyer could obtain geographic location information for $0.05 with a 70% correlation, it may well be a preferred purchase to flight records, which cost $5.00 and have a 100% correlation. Within a signals advertising application embodiment, the signal marketplace provides services to the buyer for discovering, directing and optimizing the purchase of signals for targeted advertising, including campaigns across multiple prospective sources, to determine which signals (if any) have relevance to a given advertising campaign, and providing both buyers and sellers with a liquid market in which to exchange, and protect, information, while providing and purchasing use of the signals within the marketplace or exchange. Significantly, a category of signals that represents real time or near real time activity, events, states and behavior have values that decay quickly with time. In this instance a signal that represents an object's activity one second ago has a greater value than the same signal that is one hour old. The signals marketplace enables the transmission of these real time signals within the rules and constraints of the participants, consumers, marketplace and regulatory authorities.

Furthermore, the marketplace for signals includes a signals index for discovery, tracking and comparing signals and their historical value, reputation and performance. Categories or groups of signals by type, behavior, seller, and usage are also provided. By way of example and not limitation, signals include an expression of frequency and relevance toward an input variable (e.g., affinity to a city, type of food, automobiles, sports, etc.). Also, signals responses are tracked with unique object identifiers which the seller uses internally to uniquely identify a given object. By way of example and not limitation, object identifiers include encrypted forms of e-mail address, phone number, location, loyalty card number, etc. Correlation between signals and their performance is represented by the signal pricing and trading (buying/selling) within the virtual marketplace, third party observers, and/or directly between signal sellers and signal buyers. Additionally, initial rating for expected correlation between signals and their performance is provided by the seller. A new signal will have no historical performance and thus buyers will likely minimize their purchase until the performance can be validated.

In the embodiment having a signals marketplace or exchange including at least one correlation engine, the centralized server computer associated with the signals marketplace maintains a master directory of signals and associated correlations in order to facilitate buyer discovery, matching, clearing and settlement, reputation, identifying data leakage, and performance. Historical performance of a signal, signal seller and third party observer information may be used to correlate between signals based upon buyer and usage. Additionally, initial rating for expected correlation between signals and their performance is provided by the seller. A new signal will have no historical performance and thus buyers may likely minimize their purchase or until the performance can be validated.

As illustrated in FIG. 1, the flow diagram indicates signal construction or generation method steps. Signals are based on structured 380 and unstructured 370 data. The content of the seller's signal is based upon an historical interaction with one or more events, objects or activities that correspond to the behavior of an object. To obtain the seller's signal, the buyer must provide a reference point for the seller to create the behavior data. For example, a signal of AFFINITY_TO_CITY may require input of ID, and CITY_NAME. A plane, a phone, a consumer, a computer could all have an affinity to a city. Similarly a phone company, an airline, a rental car company, a bank, a search engine, a restaurant, or similar entity could all have a set of data that would inform the affinity toward a city. The signal seller has multiple options when constructing a signal of "AFFINITY_TO_CITY", sellers could use consumer billing records, flight records, payment records, location records, in sourcing data for to respond to this request. In order to protect consumer information, the signal seller may use any source of information in constructing a response and a signal response is always normalized to be between 0 and 1. For example an airline may use flight information to determine that a consumer has traveled to NYC five times in the last year and has set AFFINITY_TO_CITY for New York equal to 0.5. The value of this information is completely dependent on its accuracy, recency, competing information sources, price and intended use. The marketplace informs, through marketplace analytics 250, the rules and pricing engine 320 of relevant information to set price.

Signal sellers have control over how they sell their signals data within the rules engine 320. These rules can be constructed based on any marketplace attribute. For example if United Airlines bought signals data within the signal marketplace, or directly from signals seller(s), and receives a response from a signals data seller that is a competing airline for a particular traveler, United Airlines could surmise the this particular traveler uses the competing airline for travel to that city and could thus directly market to the that consumer. In one embodiment of the present invention, the signals data seller rules engine 320 is within the control and ownership of the each signal seller. In this case, the marketplace data is not held centrally; remote signal index information may be transferred to the common centralized server computer for the signals market. Significantly, this federated model provides for control of the data by the owner, allowing the marketplace to establish linkage to federated data owners, with each data owner in control of rules and parameters for the release of information to approved buyers; allowing the centralized market to manage rules during the exchange and provide for clearing and settlement of federated data (signals) for multiple participants and/or multiple federated data sources which act in concert toward a common objectives, with each participant paid based upon value delivered, observed externally or price agreed to.

By way of example and not limitation, the signal marketplace rules include registration of participants, construction of signals, destruction and safeguarding of data, purchase of signals, use of signals, tracking of signal performance, clearing and settlement, marketplace history, tracking reputation of signals and all participants, involvement of non-participants, dispute process, participant responsibilities, and other significant areas. Given that the price of signals is unknown to any given buyer, the prospective buyer must first issue a request for quote to a signal seller. The request for quote contains information necessary for the seller to determine price and establish bid-response communication protocol. Sellers respond with a request for quote (RFQ) response or no response. If there is an RFQ response it can include acceptance or alternate terms. Upon receiving the RFQ response the buyer may propose alternate terms until an acceptance is issued by the seller via the network-based communications between distributed computing devices. Upon receiving the accepted RFQ message from the seller, the buyer issues a binding purchase confirmation after which the seller confirms receipt and respond with the delivery of the signal(s) in the timeframe specified. Signals can be transmitted in any volume defined within the purchase confirmation. By way of example and not limitation, signal pricing can consist of both fixed price and price based upon an objective measured within the marketplace. The marketplace embodying the invention provides an anonymous trading system having a communicating network for transmitting electronic messages between distributed computers of signal sellers and signal buyers. A plurality of order input devices such as buyer and seller terminals are connected to the communication network. Each signal order device may generate price quotation messages, which include bid and/or offer prices and may communicate estimated price and analytics information to a buyer. A plurality of seller rules and pricing engines are connected to the network, to match bids and offers the marketplace execute deals and records transactions where matches are made. At least one of the matching engines has an associated market publisher 400 (illustrated in FIG. 2), which with the signal will be distributed and tracked.

Trackable behaviors are defined within the marketplace and may include by way of example and not limitation: purchase with one time use code, purchase with credit card, location, registration, viewing of a web site, opening of email, phone call or viewing of a television show or commercial. Marketplace rules require participants to record defined behaviors and object identifiers which are correlated to a signal, object, event or behavior.

Within the signals marketplace or virtual marketplace or exchange, signals from multiple sources can be combined to identify objects. Similarly, object correlation to other objects, object correlation to behaviors, object correlation to events, object correlation to states, are tracked so that the marketplace requests will match corresponding data. By way of example and not limitation, objects such as: a person, a car, and a computer can all be correlated. Each of these objects can also have behaviors that can be correlated using a correlation engine, which may be provided in the centralized server computer or distributed among computers in communication over a network.

By way of example and not limitation if the signal AFFINITY_TO_CITY (New York) was combined with AFFINITY_TO_THEATER the target audience of likely Broadway Ticket purchasers could be developed. A statistical engine within the marketplace cross correlates signal performance for any given objective. The statistical engine assesses the performance of signals both in isolated and combined usage, thus retaining the ability to assess value for a single signal within the marketplace and its participants. In addition to combining signals, the marketplace statistical engine also includes random samples of other signals. Thus, signal sellers are required to support analytics driven requests for their signals data to assess the cross correlation of signals. Random sampling is also used to assess the performance the unique performance of specific signal types, and identify and or update correlations, prediction, estimations and interdependencies of signals, object, events and behaviors. In this way the random samples allow the marketplace to update correlations and indices to may make automated suggestions of alternate data sources which may improve price-performance of a given objective. When two or more signals are used toward an objective it is statistically necessary to vary the use of signals in order to properly calculate their performance, covariance and other correlations. The marketplace varies use of signals by altering their content, weighting, and presence or adding other signal information. By way of example and not limitation, an Italian restaurant wishes to advertise after the showing of a movie at a movie theater. The movie theater has a signal LEAVING MOVIE THEATER for a given object, or consumer. The campaign manager that manages the advertising campaign for an Italian restaurant finds the movie theater signal of use, but must gain additional information to determine which consumers leaving the movie theater prefer Italian food. The campaign manager requests AFFINITY to ITALIAN FOOD for a given object or consumer from the consumer's bank and the same signal from an Italian Food magazine. By varying the AFFINITY to ITALIAN FOOD use signals from the bank and the magazine, and including random signals, the statistical performance, correlation, and covariance of the bank signals, the magazine signals, and other prospective signals can be easily calculated within the marketplace analytics.

As illustrated in FIG. 2, the schematic diagram illustrates components within a signal marketplace and/or exchange of signals between signal sellers and signal buyers, and methods or processes associated with their interaction.

Federated Data Centralized Intelligence. With any given seller correlations can be held remotely with object behavior and state estimated from both internal and external data. Significantly, this remote data correlation is shared with the centralized marketplace to assist with buyer discovery and object feedback. This approach allows each signal seller to control their data within their own environment, and perform analysis locally to provide a standardized result set to data buyers. This standardized result set provides security to the owner of the data as to not allow unapproved usage and further dissemination. The result set and marketplace allow for the tracking of the benefit that this indicator provided to a given objective (e.g., marketing campaign). It also allows the seller to control the price of the response based upon the benefit to which it provides, understanding that it will provide different benefits to different buyers and different usages.

The computer-implemented method for indexing distributed data in a distributed data network in which file metadata and signal types related to unique keys are temporarily centralized within a marketplace. The method of invention calls for assigning and using a unique key to identify signals, which correlates to the key and returns it to the marketplace where it can be combined with other data sources. A key-value store built up in rows for the marketplace metadata, and updated by each node through response and direct participant edits. Each of the rows has a composite row key and a row value pair, also referred to herein as key-value pair.

Also, as illustrated in the figures, in particular in FIG. 1 and FIG. 2, a method of construction of signals/indicators directly between signal sellers and signal buyers and/or within a data marketplace to express: recency, frequency, and affinity of a given input value is illustrated (generally referenced 2000 in FIG. 2), including the following:

Pricing signals data (signals) within a market of buyers and sellers based upon performance of indicators toward an objective.

A self-organizing network for exchange of signal information between signal sellers and signal buyers.

A method of using data indicators from one or more sources, each source priced separately within a data marketplace 200 to target consumers in campaigns operating through one or more advertising publishers 400. (Data Buyer 100, Campaign Manager 150, Signal Data Marketplace 200, Signals Management 250, Publisher (Distributor) 400), in particular for campaign management, which may further include consumer 500 permissions including Consumer Rules 550 and Consumer Pricing 570, and other Seller-based components 300, including Seller Rules and Pricing 320, Signal or Indicator Construction 340, Seller Data Correlation Engines 360-40, External Data Access 360-80, Seller Unstructured Data 370, and Seller Structured Data 380).

The present invention systems and methods may further include the following: Performance based advertising within a signal data marketplace 200 with publishing targeted and traceable advertising based upon information sourced from the signals marketplace or exchange. Examples of traceable advertising include one-time use codes, coupons, discounts, loyalty, digitally stored incentives, and combinations thereof 450.

Registration of signal providers (data sellers) in a shared directory 200-300.

Registration of signal types offered by signals providers in a shared directory 300, 320, 340, 360.

Registration and participation of advertisers (signal buyers) in a signals marketplace or exchange 100, 150, 200.

Registration and participation of content distributors in a signals marketplace or exchange 400, 200.

Registration and participation of consumers in a signals marketplace or exchange 500-550, 200.

Method of governing exchange of consumer information within a data marketplace that is dependent on consumer permission and consumer defined fees 550-200.

Rules governing the exchange of signals in a marketplace 200.

Creation of advertising campaigns using distributed signals, i.e., wherein the signals are provided from different sources.

Method of automated signal selection within a data marketplace, based upon signal price performance and relevance.

The Method of communicating signal performance and pricing information within a marketplace (marketplace analytics 250).

The method of purchasing signals via dynamic pricing in a bid/response marketplace 220.

Method of tracking the performance of federated indicators/signals within a data marketplace, based upon behavior (e.g., web site visit), location, card transaction information, redemption codes, loyalty cards.

Method of pricing indicators within a data marketplace based upon behavior 600 web site visit, social sharing, location, card transaction information 650, redemption codes, and loyalty cards, as illustrated in FIG. 2.

Method of settling payment between buyer and seller 700, 320, 270, 150, 100 based upon redemption, coupon, one time code, payment, location, registration or other purchase information to confirm consumer behavior within a distributed data marketplace.

Identification of consumer marketing channel preference through signal availability, point of sale purchase information and other redemption information.

Use of consumer location information to inform effectiveness of advertising within a signals marketplace.

Use of encrypted credit card to confirm purchase within an advertising campaign.

Use of encrypted consumer ID within retailer purchase history to confirm purchase within an advertising campaign Technical interaction and message exchange between signal buyers and sellers.

Process of exchanging requested purchase of data from a data provider within a data marketplace.

Statistical method for optimizing signal selection for advertising campaigns operating with a signals marketplace or exchange.

Statistical method for optimizing advertising distribution channel based upon signal information.

Method of defining Campaign types supported by signal marketplace. Campaigns can begin with target or campaigns can be managed by distributor in a bid for consumer access by competing campaigns.

Protection of consumer information in a shared signals, and further including steps for protecting consumer anonymity in the exchange of signal information.

Clearing and settlement of signal exchange between participants in a marketplace based upon signal purchase agreements and signal performance information.

Method restraining signal exchange through rules based upon local laws of each transaction participant.

Method of selling indicators through marketplace agreements with price based upon advertising performance.

Method of Sharing revenue for consumer purchases with signal providers based upon measured consumer behavior 600.

Method of Settlement of financial obligations in a data marketplace which may include consumer behavior, consumer payment, seller flat fees, seller performance fees, and consumer revenue sharing 270.

Referring now to FIG. 3, a signal data correlation engine 360 is illustrated including the components of a signal correlation interface layer 360-140, a signal data access layer 360-30 and a data processor 360-10; wherein the signal correlation interface layer 360-140 further includes: a commission engine 360-40, an object behavior estimator 360-50, an object state estimator 360-60, a signal response management 360-70 having external data access 360-80. The signal data access layer further including an object state processor 360-20, an object behavior processor 360-23, an event manager 360-26, and signal history 360-26. The external data access is further related to external signal feedback 360-110, a marketplace data connector 360-120, an other external data connector 360-130, an external object state 360-100, and an external object behavior 360-90. The signal construction 340 from unstructured data 370 and structured data 380 also relates to the signal/seller data correlation engine 360 and seller rules and pricing 320. Signal analytics 250 is related to the data correlation engine 360 as well as behavior tracking 600 of behavior (including by observer) 650 and in the case of advertising, redemption management 700.

Referring now to FIG. 4, the signal data marketplace 200 is illustrated, providing components and relationships for participants, services, channel management, registration management, and consumer interface. For the participants, general examples are illustrated for an advertiser and/or agency 200-10, a publisher 200-20, an observer 200-30, a retailer and/or redemption agent 200-40, and a broker 200-45. For the automated services provided by the remote/centralized server computer for the virtual signal marketplace or exchange, examples are illustrated for order matching 200-50, pricing 200-60, contract management 200-70, clearing and settlement 200-80, reputation 200-90, dispute management 200-100, market analytics 200-110, and event subscription 200-120. For channel management provided by the virtual signal data marketplace 200, a publisher 200-130, behavior tracking 200-140, publisher rules 200-150, and targeting rules 200-160 are provided for automated steps within the signals marketplace or exchange. Functions of redemption management further include payment 200-170, behavior tracking 200-180, retailer 200-190, and pricing 200-200. Functions of consumer interface provided by the virtual signal marketplace include consumer rules 200-210, channel preferences 200-220, behavior 200-230, opt in/opt out 200-240, pricing 200-250, and events 200-270.

By way of additional background for the signal marketplace of the present invention, it is a significant factor how the federated data for the distributed signals is used. As opposed to "sharing lists" and joining information within a single database. Federated data keeps raw data localized with the owner responsible for disclosure, usage, pricing, security, and privacy. Within a data marketplace federated data providers (sellers) use signals as a way to protect sensitive information. Signals (or indicators described hereinabove) are a type of meta data indicators that are based upon information in control of the data sellers. These signals or indicators require input context and are sold for purposes explicitly defined within the signal marketplace. For example, in an AFFINITY_TO_CITY signal example, consumer flight records are never shared nor is the traveler's current location, rather the signal response can reflect how often or how recently an object was associated with a given city. Signals create scarcity and enable control both of which are critical in any functional marketplace. The value of any good is dependent on quality, availability, use, alternatives and price. The virtual signal marketplace performs analysis on signal results to determine effectiveness and value. This information is communicated to all participants, which informs the market of potential buyers and sellers.

In order for a signal to be controlled, the following factors or considerations are required: a) the signal's owner must have sole discretion on access and dissemination; b) the underlying data or information associated with the signal must also be controlled, since there can be no efficient market for the data or signals if they can be obtained elsewhere at a lower cost; c) a signal request must contain information for the owner to release, which includes information on the buyer, status of agreement with marketplace, agreement with the buyer (if any), consumer constraints (if any), price offered, planned usage, and combinations thereof; the marketplace processes, systems, and services to protect the exchange, assure secure delivery, track usage, track value generated, settle funds, issue receipt, deliver auditability; and combinations thereof.

There are different control requirements on "consumer information" (or personally identifiable information or PII), proprietary information, object behavior information, object state information and other generic information. Some of these control requirements are driven by regulatory issues or requirements. Some information can only be exchanged to another party where an agreement is in place (i.e., a closed market). The control elements of a signal include the following: a) signal type: open, restricted, PII; b) signal price: market, floor, value generated c) buyer information or profile; d) consumer consent information (if any).

After defining the signals to sell, and registering their corresponding rules and constraints, signals information is exchanged within the virtual signal marketplace. There are five primary data flows between a signal provider and the signal marketplace or signal exchange, including:

1) RFQ. Request for quote. In this data flow, a prospective buyer will request a price from signal provider. The signal buyer provides: ID, signal(s) requested, input parameters (e.g., destination city, campaign type, price offered (per item and per success), time, expiry time, minimum fill, maximum, settlement. Along with this information the signal marketplace or signal exchange will also provide Buyer ID reputation information.

2) RFQ Response. Signal Provider will either respond with an acceptance of order and time/quantity to fill, or a respond with alternate price/denial. The signal marketplace or signal exchange provides "optional" seller side software to manage this interaction. Rules surrounding minimum price, data effectiveness and buyer ID are incorporated to response. If offer is accepted, signal marketplace or signal exchange will begin tracking of the transaction order.

3) Purchase Confirmation. Buyers will issue purchase confirmation for approved RFQs. Within our marketplace agreement, a purchase confirmation is a commitment by the buyer to pay for information within the terms of the Commerce Signals Marketplace Agreement.

4) Signal Delivery. Signal provider provides the signals and buyer confirms receipt 5) Settlement. Transaction Reference number, quantity provided, time provided, item fees (if any), redemption fees (if any), redemptions to date, redemption expiry period, amount paid, amount paid to date, dispute reference numbers, receipt confirmed.

The present invention creates a virtual market for data, wherein the underlying or actual data has been transformed into signals or indicators to protect the underlying data, while still providing information relating to the data that is actionable by signal buyers. Each data seller can develop their own signals or indicators, controlled by their own rules and corresponding correlation engine(s), which data they wish to sell to the outside world. For example a retailer could develop a signal "affinity for golf" with a result of 0-1. Consumers who buy golf balls, golf equipment would have a stronger signal based upon affinity. Golf marketers could subsequently use this information to better inform advertising, in particular for targeted advertising campaigns.

Signal buyers participate directly with signal sellers and/or in the marketplace to identify objects that they wish to influence or measure. Other entities, such as campaign managers, publishers, media companies take different roles in the measurement and influencing of the behavior of objects through the use of signal information. The virtual marketplace supports both buyer led transactions and seller led transactions. By way of example and not limitation seller led campaigns can begin with a publisher that has a relationship with a consumer of a given profile. Buyers can bid for the influencing the behavior of that consumer through the marketplace. Marketplace participants can assume multiple roles such as buyer, seller, and distributor.

Regardless of signal or indicator construction, signals must be registered to participate in the signal marketplace. To provide security to protect the signals within the marketplace, and to control signal dissemination or access and distribution to signals registered in the signal marketplace, multiple object identifiers can be used. By way of example and not limitation these include encrypted forms of e-mail address, card number, phone numbers, device ID, location, loyalty card and address as key for purchase of information from a seller. Thus the data seller or signal provider controls the information that is shared within the marketplace and with prospective buyers. These controls relate to access, viewing, downloading, copying, etc. and combinations thereof.

Technical communication protocols for signals include writing data of the buyer into a buyer computer application; notifying buyer computer application to send XML file when data has been written to the marketplace order computer application data file by the buyer computer application; monitoring the marketplace order computer application queue from the marketplace execution application for notification that data has been written to the data file by the buyer computer application; reading the data of the buyer computer application data file from the marketplace execution computer application upon detection of notification; notifying marketplace order computer application to send XML file when data has been written to the seller computer application data file by the marketplace order computer application; monitoring the seller computer application queue from the marketplace order application for notification that data has been written to the data file by the marketplace order computer application; notifying a buyer computer application read file when data has been read by the seller computer application from the marketplace order computer application data file; monitoring the seller read file from the marketplace order computer application for notification that data has been read from to the buyer computer application data file by the seller computer application to initiate further writing to the marketplace order computer application data file.

FIG. 5 is a schematic diagram of an embodiment of the invention illustrating components and functions relating to signals management, generally referenced 250. The components include: Signal Directory 250-200; Customer Directory 250-210; Publisher Directory 250-220; Transformation 250-230; Event Management 250-240; Signal Request Management 250-10; Regulatory Reporting 250-12; Security 250-14; Rules Enforcement 250-16; Signal Delivery 250-20; Signal Interface Layer 250-21; and a Signal Management Correlation Engine further including 250-170; Correlation Engines 250-70; Signal Discovery 250-75; Object Behavior Estimator 250-80; Object State Estimator 250-90; Signal Response Management 250-100; External Data Access 250-130; External Object State 250-120; External Object Behavior 250-110; Other External Data Connector 250-160; Participant Data Connector 250-150; External Signal Feedback 250-140; and Data Storage 250-170.

The object behavior estimator uses one or more statistical engines to predict behavior of an object to external signals (which represent events or stimuli). Objects such as people have a current state (e.g., in transit, having a baby, sitting at home) and historical behavior patterns that are both dynamic and complex. For example, historically when a person (Joe) travels to Chicago he has historically flown by united airlines, stays at a Marriott, and eats at a steak chain restaurant for dinner. This information is held by many Observers such as airlines, credit card companies, hotel chains, mobile phone companies, etc. Thus the object Joe has behaviors that are correlated to travel to Chicago.

Observers which sell their observations in the data marketplace are signal sellers. There are two primary flows by which a signal sellers (or signal owners) interact with a signal buyer: Buyer Initiated Request for Signal, and Seller Initiated Signal.

A buyer initiated signal typically requests predict behavior of an object from historical observation information. For example the signal request of affinity to City, with the object context of the city of Chicago for object Joe, could be sent to an airline observer. In this example, the airline observer would correlate their historical travel data on passenger travel to Chicago for object Joe and return information regarding the recency and frequency of Joe's travel to Chicago. An object behavior estimator could further predict the future travel based not only on an Airline observer's historical data, but their data correlated to external data such as a business conference, or another objects actions and behaviors (example Joe always travels with Susan to Chicago). Within the distributed (or federated) signals marketplace, each observer retains the correlation to external data signals, not based upon the data itself. For example the correlation engines for the airline above would hold both internal correlation of Joe's travel preferences toward an external signal request, and the correlation of airline data to other external objects and behaviors (Susan's travel and conference events). The airline would not know the identity of the object Susan, but only that there is a strong correlation to an external object behavior (Susan is traveling to Chicago). Neither would the airline know that the external event was a specific conference. To summarize, the statistical machines within the data correlation engines and the estimators provide correlation of internal data to external objects and behaviors. These correlations allow for prediction of current state and behavior to external stimuli, with external information protected by the signals construct.

In a seller initiated signal, the observation signal has buyers that have registered for the observation, without historical context. In this model it is the buyer that has correlated an external signal (from the seller) toward an objective. An example of a seller initiated signal is an airline with a signal Airline-Ticket-Purchase by object at time. In this example, the seller initiated signal is an event, which one or more buyers have chosen to register for within the signals marketplace, and the seller has agreed to terms, which are contained within the Marketplace Contract Management System. For example, when Joe purchases an airline ticket, the airline (acting as signal seller) informs approved signal buyers Marriott and Hilton that Joe will be travelling to Chicago. Event signals are a primary real time mechanism for selling and transferring observations. The signals marketplace provides for the dissemination of approved real time data within the signals metaphor to protect the contents of the information (or underlying data), its usage and performance, and realize value of the information based upon time decay. The signal Purchased-Airline-Ticket has a higher value within 1 second of the event, than at 10 minutes, 10 hours, or 10 days. The marketplace provides for price prediction based upon the time decay, and for measurement of performance of the event signal during its use. For example, if the hotel chain Hilton was able to use the Signal Purchased-Airline-Ticket to secure a reservation by Joe, where Joe had previously stayed at Marriott, Hilton received a known value in the incremental sale of that Chicago room. If the Signal Purchased-Airline-Ticket was the only signal used in an advertising campaign (or "campaign") to Joe, than the performance of the signal toward the objective is known. If Purchased-Airline-Ticket was used in conjunction with other information the marketplace will calculate the proportional effectiveness of the Airline signal in the context of other signals used.

Figure 6:
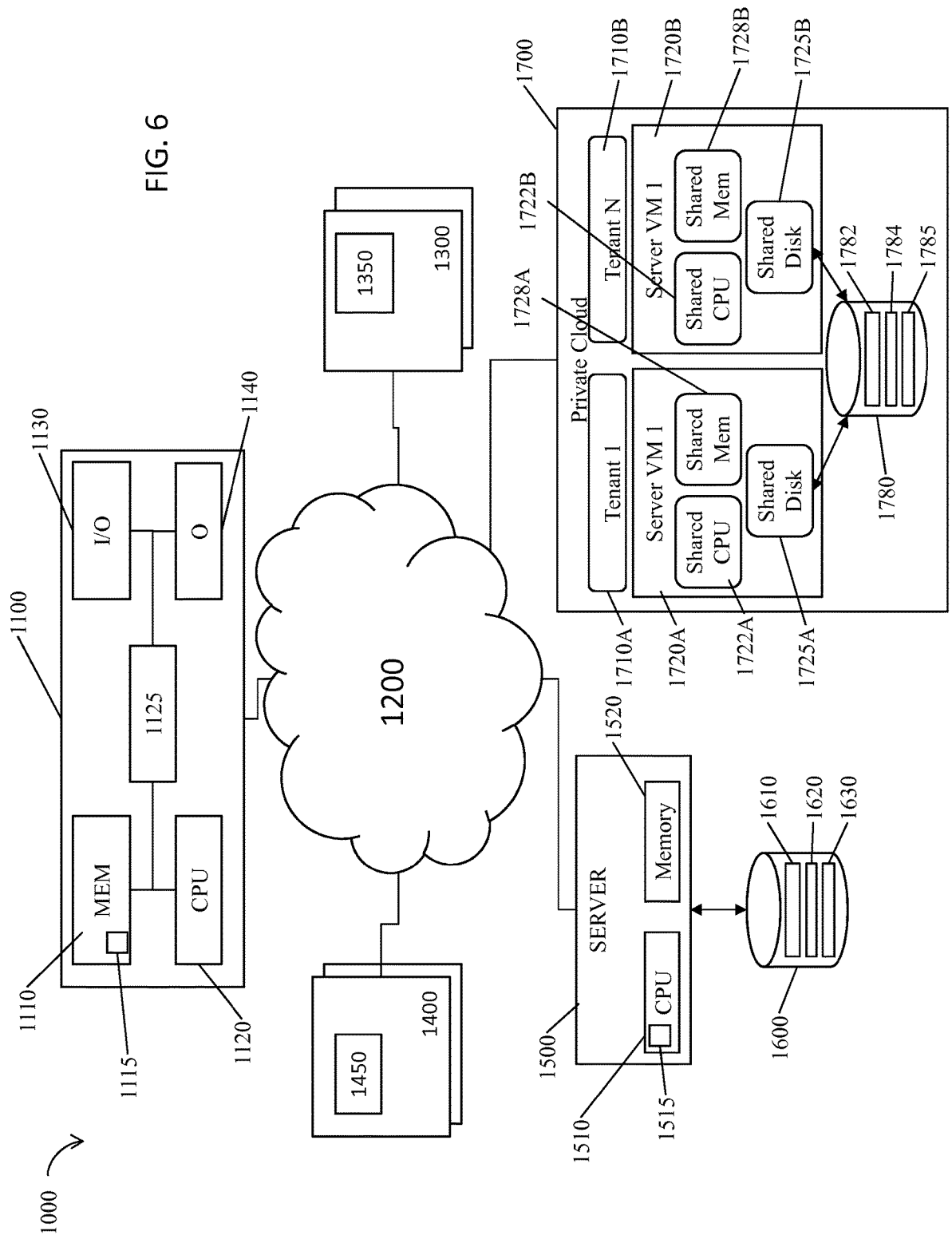
FIG. 6 is a schematic diagram illustrating a virtualized system for the present invention.

As illustrated in FIG. 6, the system 1000 is comprised of both dedicated servers 1500 and servers operating within a private cloud 1700. The dedicated servers 1500 contain: processing units 1510, memory 1520 data storage 1600. Dedicated servers 1500 are constructed, configured and coupled to enable communication over a network 1200. Servers 1720 operating within a private cloud 1700 leverage shared processing units 1722A, shared memory 1725A and shared disk 1728A are also configured and coupled to enable communications over a network 1200. The dedicated servers 1500 and cloud servers 1700 provide for user interconnection over the network 1200 using computers 1110 positioned remotely from the servers. Furthermore, the system is operable for a multiplicity of remote computers or terminals 1300, 1400 to access the dedicated servers 1500 and servers 1720A operating within a private cloud 1700 remotely. For example, in a request and reply architecture devices registered to marketplace participants may interconnect through the network 1200 to access data within dedicated servers 1600 and within the private cloud 1780. In preferred embodiments, the network 1200 is the Internet, or it could be an intranet, or any other network suitable for searching, obtaining, and/or using information and/or communications, including receiving the notification and providing a response.

The system of the present invention further includes an operating system 1515 installed and running on the dedicated servers 1500, enabling servers 1500 to communicate through network 1200 with the remote, registered devices. The operating system may be any operating system 1515 known in the art that is suitable for network communication. A memory within dedicated servers 1520 is interconnected with the server 1500. Memory 1520 may be integral with server 1500 or may be external to the server and interconnected therewith. A program of instruction 1620 is resident in memory 1520 within the parameters set by the operating system 1515 which accesses persistent storage 1600.

The system of the present invention further includes servers 1720A which support multiple tenants 1710A within a private cloud 1700 that share system resources through multiple virtual machines 1720A. Each virtual machine 1720A consists of an operating system installed and running on shared processing units 1722A, shared memory 1725A, shared persistent storage 1728A which access programmatic and user data 1782. The private cloud 1700 communicates through the network 1200 with remote registered devices. The operating system and virtual machines 1720A may be any such kind known in the art that is suitable for managing multi-tenant cloud services and network communication. Memory 1725A within shared cloud infrastructure is interconnected with each associated virtual machine 1720A according to the operating system running within the processing unit 1722A. A program of instruction 1782 is managed within memory 1725A upon retrieval by disk management 1728A within the parameters set by the operating system 1720 and virtual machine.

Figure 7:
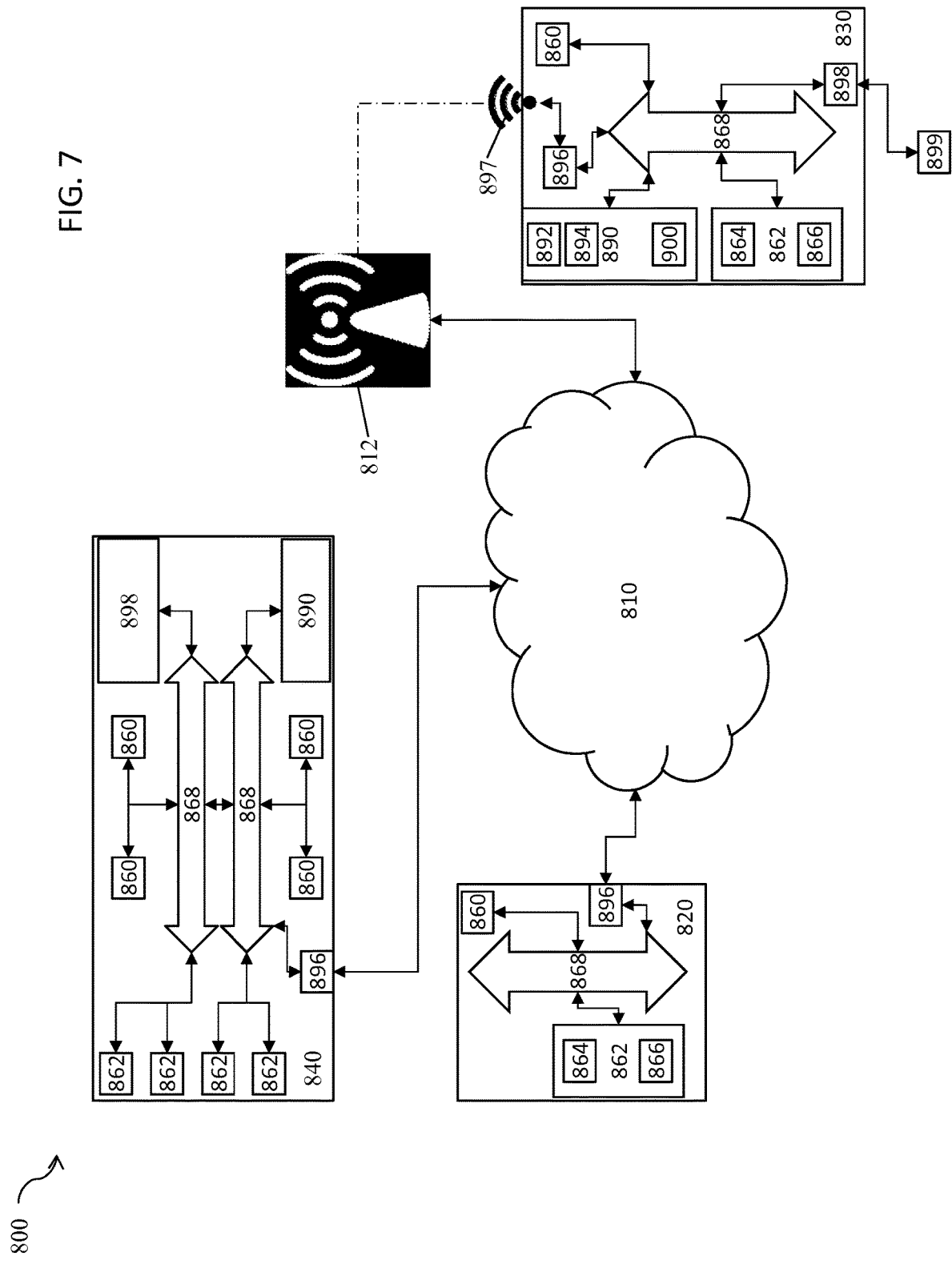
FIG. 7 is another schematic diagram illustrating a computer system for the present invention.

Additionally or alternatively to FIG. 6, FIG. 7 is a schematic diagram of an embodiment of the invention illustrating a computer system, generally described as 800, having a network 810 and a plurality of computing devices 820, 830, 840. In one embodiment of the invention, the computer system 800 includes a cloud-based network 810 for distributed communication via a wireless communication antenna 812 and processing by a plurality of mobile communication computing devices 830. In another embodiment of the invention, the computer system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital devices 820, 840, 850 and mobile devices 830, such as a server, blade server, mainframe, mobile phone, a personal digital assistant (PDA), a smart phone, a desktop computer, a netbook computer, a tablet computer, a workstation, a laptop, and other similar computing devices.

The components shown here, their connections and relationships, and their functions, are meant to be exemplary only, and are not meant to limit implementations of the invention described and/or claimed in this document.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers) or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as in FIG. 7, a computing device 840 may use multiple processors 860 and/or multiple buses 868, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multiprocessor system). Alternatively, some steps or methods may be performed by circuitry that is specific to a given function.

According to various embodiments, the computer system 800 may operate in a networked environment using logical connections to local and/or remote computing devices 820, 830, 840, 850 through a network 810. A computing device 830 may connect to a network 810 through a network interface unit 896 connected to the bus 868. Computing devices may communicate communication media through wired networks, direct-wired connections or wirelessly such as acoustic, RF or infrared through a wireless communication antenna 897 in communication with the network's wireless communication antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications or other data embodying any one or more of the methodologies or functions described herein. The computer readable medium may include the memory 862, the processor 860, and/or the storage device 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory or other solid state memory technology, disks or discs (e.g., digital versatile disks (DVD), HD-DVD, BLU-RAY, compact disc (CD), CD-ROM, floppy disc) or other optical storage, magnetic cassettes, magnetic tape, magnetic disk storage or other magnetic storage devices, or any other medium that can be used to store the computer readable instructions and which can be accessed by the computer system 800.

It is also contemplated that the computer system 800 may not include all of the components shown in FIG. 7, may include other components that are not explicitly shown in FIG. 7, or may utilize an architecture completely different than that shown in FIG. 7. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A method for creating and processing real-time commerce signals for use in a virtualized or cloud-based commerce data marketplace, the method steps comprising:
   a wireless computer network hotspot receiving a request for Internet access from a computer;
   a data source computer creating raw data based on the request for Internet access from the computer, wherein the raw data includes location data and/or a computer identification for the computer;
   constructing at least one real-time signal including anonymized identifiers from the raw data on the data source computer, wherein the at least one real-time signal is constructed based on at least one behavioral reference point and includes an abstracted payload corresponding to the at least one behavioral reference point;

the raw data including structured data and unstructured data, wherein the unstructured data and the structured data include records of interaction with an object, wherein the at least one real-time signal represents the raw data without being the raw data and without disclosing the raw data, wherein the at least one real-time signal is constructed in a form that is relevant for a predetermined signal use based on the at least one behavioral reference point, wherein the at least one real-time signal provides for privacy protection for the object such that the at least one real-time signal does not disclose an identity of the object, wherein the anonymized identifiers provide privacy protection for the object, and wherein the raw data remains localized on the data source computer;

providing a distributed data system having a remote server computer constructed and configured for network-based communication with a multiplicity of distributed computers;

wherein the remote server computer includes at least one data correlation engine that receives the at least one real-time signal and automatically generates a signal index by generating at least one correlation value for the at least one real-time signal by correlating the at least one real-time signal with external signals held externally by at least one other distributed computer;

wherein the external signals are correlated to external objects, external events, external behaviors, and external states;

wherein each of the at least one real-time signal corresponds to a state of the object, a behavior of the object correlated to the state of the object, and the event associated with the object;

the at least one data correlation engine processing the at least one real-time signal and the external signals to generate the signal index by correlating the state of the object, the behavior of the object correlated to the state of the object, and an event associated with the object to the external objects, the external events, the external behaviors, and the external states;

wherein the signal index includes at least one signal value for the predetermined signal use;

wherein the at least one correlation value decays with respect to time and the at least one signal value decays with respect to time; and wherein the signal index is maintained for a specific objective;

the at least one data correlation engine generating a price for each of the at least one real-time signal based on the at least one correlation value;

providing the at least one real-time signal, thus permitting the predetermined signal use without providing the raw data including the records of interaction with the object from which the at least one real-time signal was created, wherein a unique transaction identifier identifies the at least one real-time signal;

wherein a signal construct for each of the at least one real-time signal defines a source of the at least one real-time signal, a destination of the at least one real-time signal, the predetermined use of the at least one real-time signal, a price of the at least one real-time signal, a delivery channel of the at least one real-time signal, a method for securing the raw data of the at least one real-time signal, the unique transaction identifier of the at least one real-time signal, a transaction time of the at least one real-time signal, a duration of time for which the abstracted payload can be stored for the at least one real-time signal, and a value of the abstracted payload of the at least one real-time signal;

receiving at least one second behavioral reference point and generating at least one synthetic signal based on the at least one second behavioral reference point, the at least one real-time signal, and at least one second signal; and modifying the at least one correlation value based upon feedback from actual signal use of the at least one real-time signal and the at least one synthetic signal.

2. The method of claim 1, further including the step of receiving a feedback corresponding to the behavior of the object correlated to the state of the object, an activity, or the event associated with the object.

3. The method of claim 2, further including the step of automatically adjusting the at least one correlation value for the at least one real-time signal based on the feedback.

4. The method of claim 2, further including the step of updating the signal index to include the feedback.

5. The method of claim 1, wherein the at least one data correlation engine includes a plurality of distributed data correlation engines.

6. The method of claim 1, further including the step of receiving information about the at least one real-time signal and the at least one data correlation engine automatically generating or calculating behavior correlation data.

7. The method of claim 6, further including the step of outputting the behavior correlation data for correcting or adjusting or modifying the at least one correlation value via a feedback loop including results from using the at least one real-time signal for the predetermined signal use.

8. The method of claim 7, wherein the feedback loop includes at least one participant selected from the group consisting of: data buyer, advertiser, advertising campaign manager, publisher, consumer, retailer, behavior tracker, behavior observer, redemption manager, and combinations thereof.

9. The method of claim 1, further including the step of the at least one correlation engine automatically discovering or identifying or selecting a subset of a multiplicity of real-time signals having relevance toward an object objective or a behavior objective.

10. The method of claim 9, further including the step of the at least one correlation engine automatically ranking the multiplicity of real-time signals having relevance toward the object objective or the behavior objective.

11. The method of claim 9, further including the step of the at least one correlation engine automatically estimating the at least one correlation value for the at least one real-time signal with respect to a target objective, a target object, or a target behavior.

12. The method of claim 1, further including the step of receiving information confirming compliance with the predetermined signal use.

13. The method of claim 1, further including the step of automatically matching the indexed signals with distributed real-time signal buyers.

14. The method of claim 1, wherein the at least one real-time signal includes information about real-time events, object state, object behavior, recency, behavior frequency, or behavior affinity.

15. The method of claim 1, wherein the at least one real-time signal includes a signal type selected from the group consisting of: state signals, real-time event signals, real-time activity signals, behavior signals, relational signals, location signals, loyalty signals, purchase signals, social signals, performance signals, and combinations thereof.

16. The method of claim 1, wherein the at least one data correlation engine is centralized and associated with a server computer.

17. The method of claim 1, further including the step of providing at least one centralized correlation engine and at least one distributed correlation engine for identifying real-time signals relevant to the specific objective based upon an external object state, environmental data, or an external object behavior.

18. The method of claim 1, further including the step of the at least one correlation engine identifying limitations on real-time signal availability to a signal marketplace based upon a rules engine that automatically considers buyer identity, campaign type, signal requested, price, redemption signal type, purchase quantity, past performance of signal, past performance of campaign type, past performance of buyer, and combinations thereof.

19. The method of claim 1, wherein random samples of other signals and varying the use of defined signals defines the statistical performance, correlation, and covariance of the at least one real-time signal.

20. A system for creating and processing real-time commerce signals in a virtualized or cloud-based commerce data marketplace computing system comprising:
a distributed data system having a remote server computer constructed and configured for network-based communication with a multiplicity of distributed computers;
wherein the remote server computer includes at least one data correlation engine operable to receive at least one real-time signal and at least one synthetic signal, wherein the at least one data correlation engine is further operable to automatically generate a signal index associated with the at least one real-time signal by generating at least one correlation value for the at least one real-time signal by correlating the at least one real-time signal with external signals held externally by at least one other distributed computer;
wherein the at least one correlation value is operable to be modified based upon feedback from actual signal use of the at least one real-time signal and the at least one synthetic signal;
wherein the external signals are correlated to external objects, external events, external behaviors, and external states;
wherein each of the at least one real-time signal corresponds to a state of an object, a behavior of the object correlated to the state of the object, and an event associated with the object;
wherein the signal index includes at least one signal value for a predetermined signal use;
wherein the at least one correlation value decays with respect to time and the at least one signal value decays with respect to time;
a wireless computer network hotspot operable to receive a request for Internet access from a computer;
a data source computer operable to create raw data based on the request for Internet access from the computer, wherein the raw data includes location data and/or a computer identification for the computer;
wherein the at least one real-time signal is constructed from the raw data on the data source computer, wherein the at least one real-time signal is constructed based on at least one behavioral reference point and includes an abstracted payload corresponding to the at least one behavioral reference point;
wherein the at least one synthetic signal is generated based on at least one second behavioral reference point, the at least one real-time signal, and at least one second signal;
wherein the raw data includes structured data and unstructured data, wherein the unstructured data and the structured data include records of interaction with the object, wherein the at least one real-time signal represents the raw data without being the raw data and without disclosing the raw data, wherein the at least one real-time signal provides for privacy protection for the object such that the at least one real-time signal does not disclose an identity of the object, wherein anonymized identifiers provide privacy protection for the object, and wherein the raw data remains localized on the data source computer;
wherein the at least one data correlation engine is operable for processing the at least one real-time signal and the external signals to generate at least one correlation value by correlating the state of the object, the behavior of the object correlated to the state of the object, and the event associated with the object to the external objects, the external events, the external behaviors, and the external states; and
wherein the at least one real-time signal is transmitted for the predetermined signal use without providing raw data including the records of interaction with the object from which the at least one real-time signal was created, wherein a unique transaction identifier identifies the at least one real-time signal;
wherein the predetermined signal use is provided by an agreement; and
wherein a signal construct for each of the at least one real-time signal defines a source of the at least one real-time signal, a destination of the at least one real-time signal, the predetermined use of the at least one real-time signal, a price of the at least one real-time signal, a delivery channel of the at least one real-time signal, a method for securing the raw data of the at least one real-time signal, the unique transaction identifier of the at least one real-time signal, a transaction time of the at least one real-time signal, a duration of time for which a payload can be stored for the at least one real-time signal, and a value of the payload of the at least one real-time signal.

21. The system of claim 20, further comprising an object state estimator operable for creating correlations from real-time signals within a distributed real-time signals environment.

22. The system of claim 20, further comprising an object behavior estimator operable for storing values of at least one expectation for the at least one real-time signal.

* * * * *